(12) United States Patent
Wu et al.

(10) Patent No.: US 11,294,592 B2
(45) Date of Patent: Apr. 5, 2022

(54) METHOD AND DEVICE FOR DATA PROCESSING, AND COMPUTER DEVICE

(71) Applicant: Alibaba Group Holding Limited, Grand Cayman (KY)

(72) Inventors: Dongzheng Wu, Beijing (CN); Chengyu Dong, Beijing (CN); Jinxin Liu, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/923,999

(22) Filed: Jul. 8, 2020

(65) Prior Publication Data

US 2020/0341680 A1    Oct. 29, 2020

Related U.S. Application Data

(63) Continuation of application No. PCT/CN2019/070581, filed on Jan. 7, 2019.

(30) Foreign Application Priority Data

Jan. 9, 2018 (CN) .......................... 201810020395.X

(51) Int. Cl.
*G06F 3/06* (2006.01)
*G06F 9/48* (2006.01)

(52) U.S. Cl.
CPC .......... *G06F 3/0656* (2013.01); *G06F 3/0619* (2013.01); *G06F 3/0659* (2013.01); *G06F 3/0673* (2013.01); *G06F 9/485* (2013.01)

(58) Field of Classification Search
CPC .... G06F 3/0656; G06F 3/0619; G06F 3/0659; G06F 3/0673; G06F 3/061; G06F 3/064;
(Continued)

(56) References Cited

U.S. PATENT DOCUMENTS 7,596,643 B2    9/2009 Merry, Jr. et al.
8,140,805 B2    3/2012 Davis et al.
(Continued)

FOREIGN PATENT DOCUMENTS

CN    101241420 A    8/2008
CN    102364474 A    2/2012
(Continued)

OTHER PUBLICATIONS

Translation of International Search Report for corresponding PCT Application No. PCT/CN2019/070581 dated Apr. 4, 2019, a counterpart foreign application for U.S. Appl. No. 16/923,999, 2 pages.
(Continued)

*Primary Examiner* — Hiep T Nguyen
(74) *Attorney, Agent, or Firm* — Lee & Hayes, P.C.

(57) ABSTRACT

A data processing method including: searching for a smallest data unit of a buffer with regard to appending data in an append write request; sequentially writing at least some of the appending data into the smallest data unit of the buffer to obtain a first smallest data unit to be stored, and writing data not yet written in the appending data into at least one smallest data unit to obtain at least one second smallest data unit to be stored; writing the first smallest data unit to be stored into a storage device in an overwriting manner, and sequentially writing the at least one second smallest data unit to be stored into the storage device; and buffering a smallest data unit not fully written that corresponds to the appending data. The present disclosure ensures data integrity, increase operation convenience, and write operation efficiency.

20 Claims, 12 Drawing Sheets

(58) Field of Classification Search
CPC ...... G06F 3/0676; G06F 3/0643; G06F 9/485; G06F 11/1076; G06F 11/1446; G06F 11/1435; G06F 11/1004; G06F 16/1805
See application file for complete search history.

(56) References Cited

U.S. PATENT DOCUMENTS

| | | | |
|---|---|---|---|
| 8,239,607 B2 | 8/2012 | LaBerge | |
| 8,370,683 B1 | 2/2013 | Ryan et al. | |
| 9,760,281 B2 | 9/2017 | Ramalingam | |
| 2005/0223154 A1 | 10/2005 | Uemura | |
| 2006/0047872 A1 | 3/2006 | Nakagawa et al. | |
| 2007/0283086 A1 | 12/2007 | Bates | |
| 2009/0138672 A1 | 5/2009 | Katsuragi et al. | |
| 2010/0011171 A1 | 1/2010 | Cousin et al. | |
| 2010/0293418 A1 | 11/2010 | Nagashima | |
| 2014/0226236 A1* | 8/2014 | Shiratori | G11B 5/00813 360/75 |
| 2015/0067000 A1 | 3/2015 | Ravuna et al. | |
| 2020/0364148 A1* | 11/2020 | Lv | G06F 11/3034 |

FOREIGN PATENT DOCUMENTS

| | | |
|---|---|---|
| CN | 102799679 A | 11/2012 |
| CN | 103257831 A | 8/2013 |
| CN | 105335098 A | 2/2016 |
| CN | 105843775 A | 8/2016 |
| CN | 106445405 A | 2/2017 |
| EP | 2735978 A1 | 5/2014 |
| WO | WO2012176539 A1 | 2/2015 |
| WO | WO2017141315 A1 | 5/2018 |

OTHER PUBLICATIONS

Translation of Written Opinion for corresponding PCT Application No. PCT/CN2019/070581 dated Apr. 4, 2019, a counterpart foreign application for U.S. Appl. No. 16/923,999, 4 pages.
Translation of Chinese Office Action for corresponding CN Application No. 201810020395.X dated Dec. 1, 2021, a counterpart foreign application for U.S. Appl. No. 16/923,999, 5 pages.
Translation of Chinese Search Report for corresponding CN Application No. 20180020395.X dated Nov. 23, 2021, a counterpart foreign application for U.S. Appl. No. 16/923,999, 1 page.
Extended European Search Report dated Sep. 2, 2021 for European Patent Application No. 19738606.3, 7 pages.

* cited by examiner

METHOD AND DEVICE FOR DATA PROCESSING, AND COMPUTER DEVICE

CROSS REFERENCE TO RELATED PATENT APPLICATIONS

This application claims priority to and is a continuation of PCT Patent Application No. PCT/CN2019/070581, filed on 7 Jan. 2019 and entitled "METHOD AND DEVICE FOR DATA PROCESSING AND COMPUTER DEVICE," which claims priority to Chinese Patent Application No. 201810020395.X, filed on 9 Jan. 2018 and entitled "METHOD AND DEVICE FOR DATA PROCESSING AND COMPUTER DEVICE," which are incorporated herein by reference in their entirety.

TECHNICAL FIELD

The present disclosure relates to the field of computer technology, and, more particularly, to the methods and devices for data processing, and computer devices.

BACKGROUND

Append write, which is a common data writing method in storage systems, refers to appending newly written data on the basis of data already written. Append write can be used to perform write operations in many application scenarios. For example, if a data file to be written is large, multiple write operations are usually required to complete writing the data file into a disk. In this case, append write can be used to perform write operations.

In order to ensure the integrity of the written data when the write operation is performed using the append write method, one data writing method used in current technologies is that the appending data is written to a new position in the disk each time; and an index relationship of the data and its storage position is established such that the data may be located according to the index relationship.

However, this method used in the current technologies requires establishing and maintaining the additional index relationship, which is less convenient in operation and low in efficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide a method and device for data processing, and a computer device to solve the technical problems of inconvenient operation and low efficiency in the conventional techniques.

An example embodiment of the present disclosure provides a data processing method, comprising:

searching for a smallest data unit of a buffer with regard to appending data in an append write request;

sequentially writing at least some of the appending data into the smallest data unit of the buffer to obtain a first smallest data unit to be stored, and writing data not yet written in the appending data into at least one smallest data unit to obtain at least one second smallest data unit to be stored;

writing the first smallest data unit to be stored into a storage device in an overwriting manner, and sequentially writing the at least one second smallest data unit to be stored into the storage device; and buffering a smallest data unit not fully written that corresponds to the appending data.

An example embodiment of the present disclosure provides a data processing method, comprising:

receiving a data-reading request;

calculating, based on a first fixed length of a smallest data unit, at least one target smallest data unit corresponding to the data-reading request; and reading, from a storage device, valid data in the at least one target smallest data unit and splicing the same, wherein valid data written in each smallest data unit comprises at least some appending data in an append write request or at least some appending data in an append write request and at least some appending data in a next append write request.

An example embodiment of the present disclosure provides a data processing method, comprising:

detecting data recovery instructions;

recovering, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein the smallest data unit comprises a data storage area and a metadata description area located at an end of the data storage area, wherein the data storage area is used to store valid data and the metadata description area is used to store metadata of the valid data; the valid data comprises at least some appending data in an append write request or at least some appending data in an append write request and at least some appending data in a next append write request.

An example embodiment of the present disclosure provides a data processing device, comprising:

a buffer searching module, configured to search for a smallest data unit of a buffer with regard to appending data in an append write request;

a data organizing module, configured to sequentially write at least some of the appending data into the smallest data unit of the buffer to obtain a first smallest data unit to be stored, and write data not yet written in the appending data into at least one smallest data unit to obtain at least one second smallest data unit to be stored;

a data writing module, configured to write the first smallest data unit to be stored into a storage device in an overwriting manner, and sequentially write the at least one second smallest data unit to be stored into the storage device; and a data buffering module configured to buffer a smallest data unit not fully written that corresponds to the appending data.

An example embodiment of the present disclosure provides a data processing device, comprising:

a request receiving module, configured to receive a data-reading request;

a calculation module, configured to calculate, based on a first fixed length of a smallest data unit, at least one target smallest data unit corresponding to the data-reading request;

a data acquisition module, configured to read, from a storage device, valid data in the at least one target smallest data unit and splice the same, wherein:

valid data written in each smallest data unit comprises at least some appending data in an append write request or at least some appending data in an append write request and at least some appending data in a next append write request.

An example embodiment of the present disclosure provides a data processing device, comprising:

a fault detection module, configured to detect data recovery instructions;

a data recovery module, configured to recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein:

the smallest data unit comprises a data storage area and the metadata description area located at an end of the data storage area, wherein the data storage area is used to store valid data and the metadata description area is used to store metadata of the valid data; the valid data comprises at least some appending data in an append write request or at least some appending data in an append write request and at least some appending data in a next append write request.

An example embodiment of the present disclosure provides a computer device, comprising a storage component and a processing component, wherein:

the storage component is configured to store one or a plurality of computer-readable instructions, wherein the one or plurality of computer-readable instructions are called and executed by the processing component;

the processing component is configured to:

search for a smallest data unit of a buffer with regard to appending data in an append write request;

sequentially write at least some of the appending data into the smallest data unit of the buffer to obtain a first smallest data unit to be stored, and write data not yet written in the appending data into at least one smallest data unit to obtain at least one second smallest data unit to be stored;

write the first smallest data unit to be stored into a storage device in an overwriting manner, and sequentially write the at least one second smallest data unit to be stored into the storage device; and buffer a smallest data unit not fully written that corresponds to the appending data.

An example embodiment of the present disclosure provides a computer device, comprising a storage component and a processing component, wherein:

the storage component is configured to store one or a plurality of computer-readable instructions, wherein the one or plurality of computer-readable instructions are called and executed by the processing component;

the processing component is configured to:

receive a data-reading request;

calculate, based on a first fixed length of a smallest data unit, at least one target smallest data unit corresponding to the data-reading request; and read, from the storage device, valid data in the at least one target smallest data unit and splice the same, wherein valid data written in each smallest data unit comprises at least some appending data in an append write request or at least some appending data in an append write request and at least some appending data in a next append write request.

An example embodiment of the present disclosure provides a computer device, comprising a storage component and a processing component, wherein the storage component is configured to store one or a plurality of computer-readable instructions, wherein the one or plurality of computer-readable instructions are called and executed by the processing component;

the processing component is configured to:

detect data recovery instructions;

recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein:

the smallest data unit comprises a data storage area and a metadata description area located at an end of the data storage area, wherein the data storage area is used to store valid data and the metadata description area is used to store metadata of the valid data; the valid data comprises at least some appending data in an append write request or at least some appending data in an append write request and at least some appending data in a next append write request.

In the example embodiments of the present disclosure, with regard to the appending data in an append write request, a smallest data unit of a buffer may be searched for first; then at least some of the appending data is sequentially written into the smallest data unit of the buffer to obtain a first smallest data unit to be stored, and data not yet written in the appending data is written into at least one smallest data unit to obtain at least one second smallest data unit to be stored; afterwards, the first smallest data unit to be stored is written into a storage device in an overwriting manner, and the at least one second smallest data unit to be stored is sequentially written into the storage device, thereby completing the operation of writing appending data into the storage device. In addition, the smallest data unit not fully written and corresponds to the appending data is continued to be buffered, so that the next append write request may continue to be executed according to the technical solution of the present disclosure. The smallest data unit is used, and the length of the smallest data unit is fixed, such that there is no need to establish and maintain an index relationship. The data storage position may be located by calculation, which improves the operation convenience. Since the smallest data units are written in the storage device in sequence, the data integrity and the efficiency of the write operation are ensured.

These or other features of the present disclosure will be more easily understood from the following description of the example embodiments.

BRIEF DESCRIPTION OF DRAWINGS

To describe the technical solutions in the example embodiments of the present disclosure more clearly, the following briefly describes accompanying drawings. Apparently, the accompanying drawings show example embodiments of the present disclosure, and a person of ordinary skill in the art may still derive other accompanying drawings from these accompanying drawings without creative efforts.

DESCRIPTION OF EXAMPLE EMBODIMENTS

Figure 1:
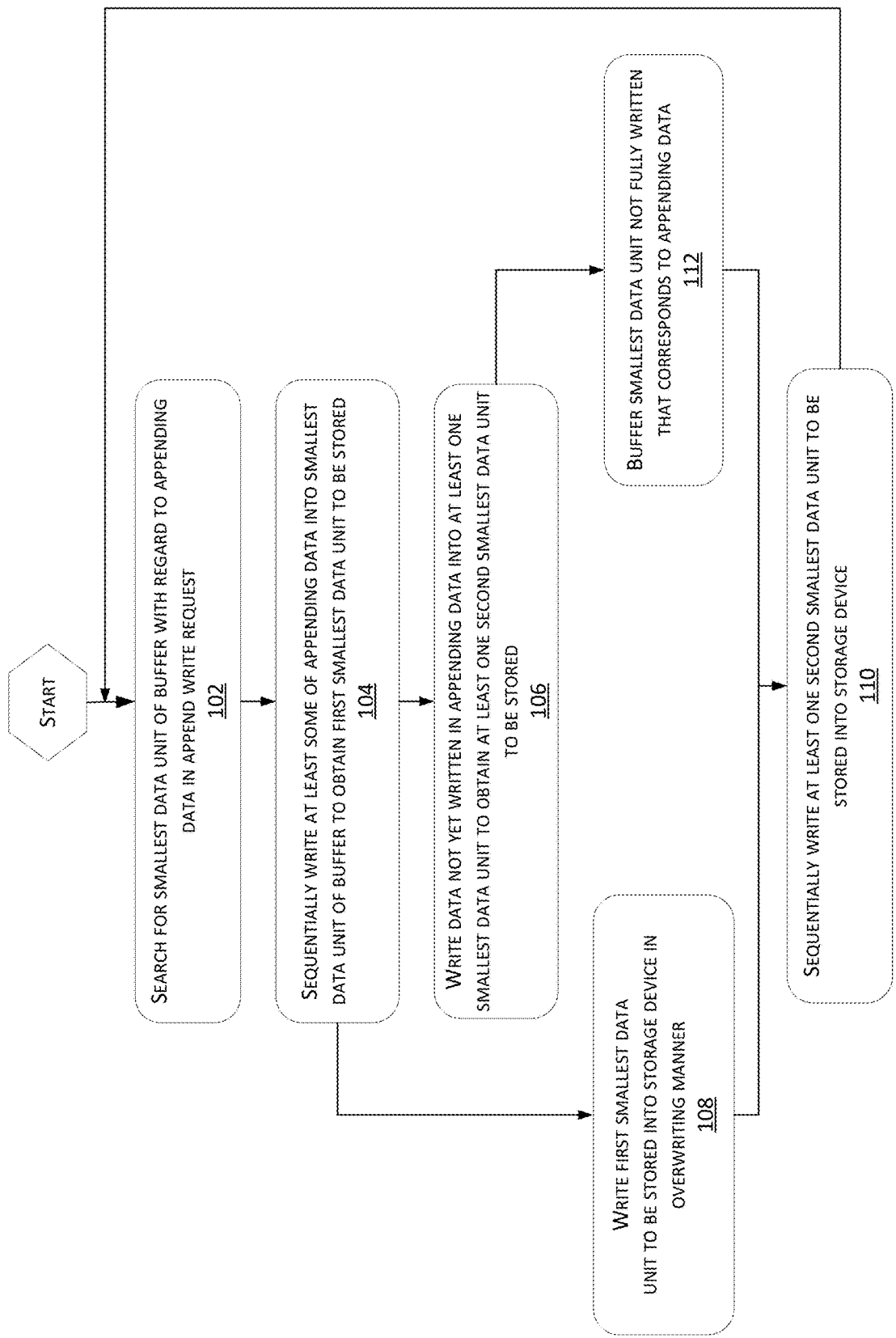
FIG. 1 shows a flowchart of an example embodiment of a data processing method provided by the present disclosure.

In order to enable a person skilled in the art to better understand the technical solutions in the present disclosure, the technical solutions in the example embodiments of the present disclosure will be described clearly and completely below in combination with reference to the accompanying drawings.

Some procedures described in the present description and claims, and the above drawings include multiple operations that appear in a specific order. However, it should be clearly understood that these operations may be executed not in a sequence described in the text, or may be executed in parallel. Sequence numbers of operations such as 102 and 104 are only used to distinguish one from other operations, and the sequence number itself does not represent any execution sequence. In addition, these procedures may include more or fewer operations, and these operations may be performed in sequence or in parallel. It should be noted that the wording like "first" and "second" in the text are used to distinguish, for example, one message, device, module, and the like from other messages, devices, and modules, and do not represent the order or define "first" and "second" being different types.

The technical solutions of the example embodiments of the present disclosure are applied to storage systems, in particular, to distributed storage systems.

To ease the understanding, technical terms that may appear in the example embodiments of the present disclosure will be explained first in what follows:

Append write: a data write method that appends new data to be written on the basis of data already written; the operation of writing data in the manner of append write is also referred to as an append write operation, and a writing method using the append write method is also referred to as append writing.

Overwrite: a data write method in which the data currently being written will correspondingly replace the data already written; the operation of writing data in an overwrite manner is also referred to as an overwrite operation, and a writing method using the overwrite method is also referred to as overwriting.

Sequential write: a data write method in which the positions of multiple write operations are continuous; the operation of writing data in a sequential write method is also referred to as a sequential write operation, and a writing method using the sequential write method is also referred to as sequential writing.

Metadata: data that describes data attributes, such as a data length and a data state.

Append write request: a write request triggered by requesting to write data using the append write method, the request carrying appending data to be written.

Request atomicity: referring to either the append write request succeeds or fails.

Storage device: a hardware device used to store data in a storage system; eventually, the data will need to be written to the storage device, which may refer to a storage medium such as a magnetic disk, and the like.

Smallest data unit: a data storage structure defined by the example embodiments of the present disclosure; appending data in an append write request will be split according to the smallest data unit to convert the appending data into the data structure format of the at least one smallest data unit; the smallest data unit is the smallest unit in which data is written to or read from the storage device, and a length thereof is fixed. For ease of description, the length of the smallest data unit defined by the example embodiments of the present disclosure is a first fixed length, which may be equal to or multiple of a sector length of a physical sector in the storage device, for example, 4K (kilobyte) or a multiple of 4K.

In many application scenarios, since data is written using the append write method, data integrity needs to be guaranteed; however, the storage device itself cannot guarantee data integrity across multiple sectors at a time. One currently adopted data writing method is to write the appending data to a new position in the storage device, and the data is located by establishing an index relationship. Although this method guarantees the data integrity and ensures that the data is not compromised, the index relationship needs to be additionally established and maintained, which makes the operation less convenient, and the write operation efficiency is low.

In order to ensure the write operation efficiency and the data integrity, and improve the operation convenience, the inventor proposes the technical solution of the present disclosure after a series of research. In the example embodiments of the present disclosure, with regard to the appending data in an append write request, a smallest data unit of a buffer may be searched for first; then at least some of the appending data is sequentially written into the smallest data unit of the buffer to obtain a first smallest data unit to be stored, and data not yet written in the appending data is written into at least one smallest data unit to obtain at least one second smallest data unit to be stored; afterwards, the first smallest data unit to be stored is written into a storage device in an overwriting manner, and the at least one second smallest data unit to be stored is sequentially written into the storage device, thereby completing the operation of writing appending data into the storage device; additionally, the smallest data unit not fully written that corresponds to the appending data is continued to be buffered, so that the next append write request may continue to be executed according to the technical solutions of the present disclosure. The smallest data unit is used, and the length of the smallest data unit is fixed, such that there is no need to establish and maintain the index relationship. The data storage position may be located by means of calculation, which improves the operation convenience; and since the smallest data units are written in the storage device in sequence, the data integrity and the write operation efficiency are guaranteed.

The technical solutions in the example embodiments of the present disclosure will be described clearly and completely hereinafter in conjunction with the drawings in the example embodiments of the present disclosure. Apparently, the described example embodiments are only a part of the example embodiments of the present disclosure, rather than all example embodiments. All other example embodiments obtained by a person of ordinary skill in the art based on the example embodiments of the present disclosure without creative efforts fall within the protection scope of the present disclosure.

FIG. 1 is a flowchart of an example embodiment of a data processing method according to an example embodiment of the present disclosure. The method may comprise the following steps:

102: search for a smallest data unit of a buffer with regard to appending data in an append write request.

The append write request is initiated with regard to a data file, which is written to a storage device through multiple append write operations. The appending data in each append write request may be part of the data in the data file; and lengths of the appending data in each append write request may vary.

104: sequentially write at least some of the appending data into the smallest data unit of the buffer to obtain a first smallest data unit to be stored.

The sequentially write at least some of the appending data into the smallest data unit of the buffer may refer to writing the at least some of the data into the smallest data unit of the buffer at a position right after where the last write operation ends.

106: write data not yet written in the appending data into at least one smallest data unit to obtain at least one second smallest data unit to be stored.

Herein, if the smallest data unit of the buffer is not present, step 106 may be directly executed.

The data not yet written in the appending data refers to data that is not written into any smallest data unit. If the appending data does not have any data not yet written, step 108 and step 110 may be executed.

108: write the first smallest data unit to be stored into the storage device in an overwriting manner.

110: sequentially write the at least one second smallest data unit to be stored into the storage device.

If the first smallest data unit to be stored is present, the first smallest data unit to be stored is first written into the storage device in the overwriting manner, and then the at least one second smallest data unit to be stored is sequentially written into the storage device. Sequentially writing the at least one second smallest data unit to be stored into the storage device means to write the at least one second smallest data unit to be stored at the position right after where the writing operation of the first smallest data unit to be stored ends in the storage device. Since the first smallest data unit to be stored is written into the storage device in the overwritten manner, the end position of the write operation for the first smallest data unit to be stored in the storage device may also be referred to as the end position of a write operation for the previous append write request in the storage device.

If the first smallest data unit to be stored is not present, the at least one second smallest data unit to be stored is directly and sequentially written into the storage device; that is, the at least one second smallest data unit to be stored is written at the position right after where the write operation for the previous append write request ends in the storage device.

112: buffer a smallest data unit not fully written that corresponds to the appending data.

The smallest data unit is a type of data storage structure, and the appending data is split according to the smallest data unit. It can be appreciated that writing at least some of the appending data into the smallest data unit and writing data not yet written in the appending data into at least one smallest data unit described in the example embodiments of the present disclosure is also a conversion operation performed on the appending data according to the data storage structure corresponding to the smallest data unit, such that the appending data is converted into the data organization format of the at least one smallest data unit. Each smallest data unit includes at least some of the appending data of an append write request.

Writing the first smallest data unit to be stored in the storage device in the overwriting manner and sequentially writing the at least one second smallest data unit to be stored into the storage device refers to the operation of storing the smallest data unit into the storage device, thereby implementing the storage of the appending data.

The at least some of the appending data is selected from a position where the appending data starts; the writing data not yet written into the at least one smallest data unit refers to that the writing starts from a position where the data not yet written starts. Data with a second fixed length is selected each time, and a smallest data unit is generated therefrom until the length of the data not yet written is less than the second fixed length. At this time, one smallest data unit is also generated to store the data not yet written, and that this smallest data unit is not fully written with data.

The length of the smallest data unit is fixed. For ease of differentiation, the length of the smallest data unit is described as a "first fixed length". In addition, the smallest data unit may write appending data with the second fixed length; and the smallest data unit not fully written with data may refer to that the data written in the smallest data unit is less than the second fixed length; the smallest data unit that is fully written with data also means that the data written in the smallest data unit is of a length equaling to the second fixed length.

As can be seen from the above, the smallest data unit stored in the buffer is the smallest data unit that is not fully written with data. For example, if the smallest data unit is present in the buffer, the appending data will be sequentially written into the smallest data unit of the buffer until the smallest sheet of reading and writing is fully written with data; and then the data not yet written will be written into at least one smallest data unit.

Since the smallest data unit of the buffer was written into the storage device in the last append write operation, the first smallest data unit to be stored is written to the storage device in the overwriting manner, such that the smallest data unit not fully written with data and was last written into the storage device is overwritten. Since the first smallest data unit to be stored is written into the appending data of the last append write request, i.e., being written into the storage device in the overwriting manner, the data integrity is guaranteed. For example, the appending data is written into the smallest data unit of the buffer, the continuity of data in the smallest data unit is guaranteed, such that continuous and complete data may be obtained when the data is read.

In this example embodiment, data is written into the storage device in the format of a smallest data unit with a fixed length. When data is to be read, the storage position of the data may be determined simply through calculation; the index relationship between the data and the storage position does not need to be maintained additionally, which improves the operation convenience. In this example embodiment, the smallest data unit is sequentially written, rather than randomly written, into the storage device, which may enhance the write operation efficiency; and the data integrity and continuity are guaranteed by using the partial overwrite operation.

Figure 2:
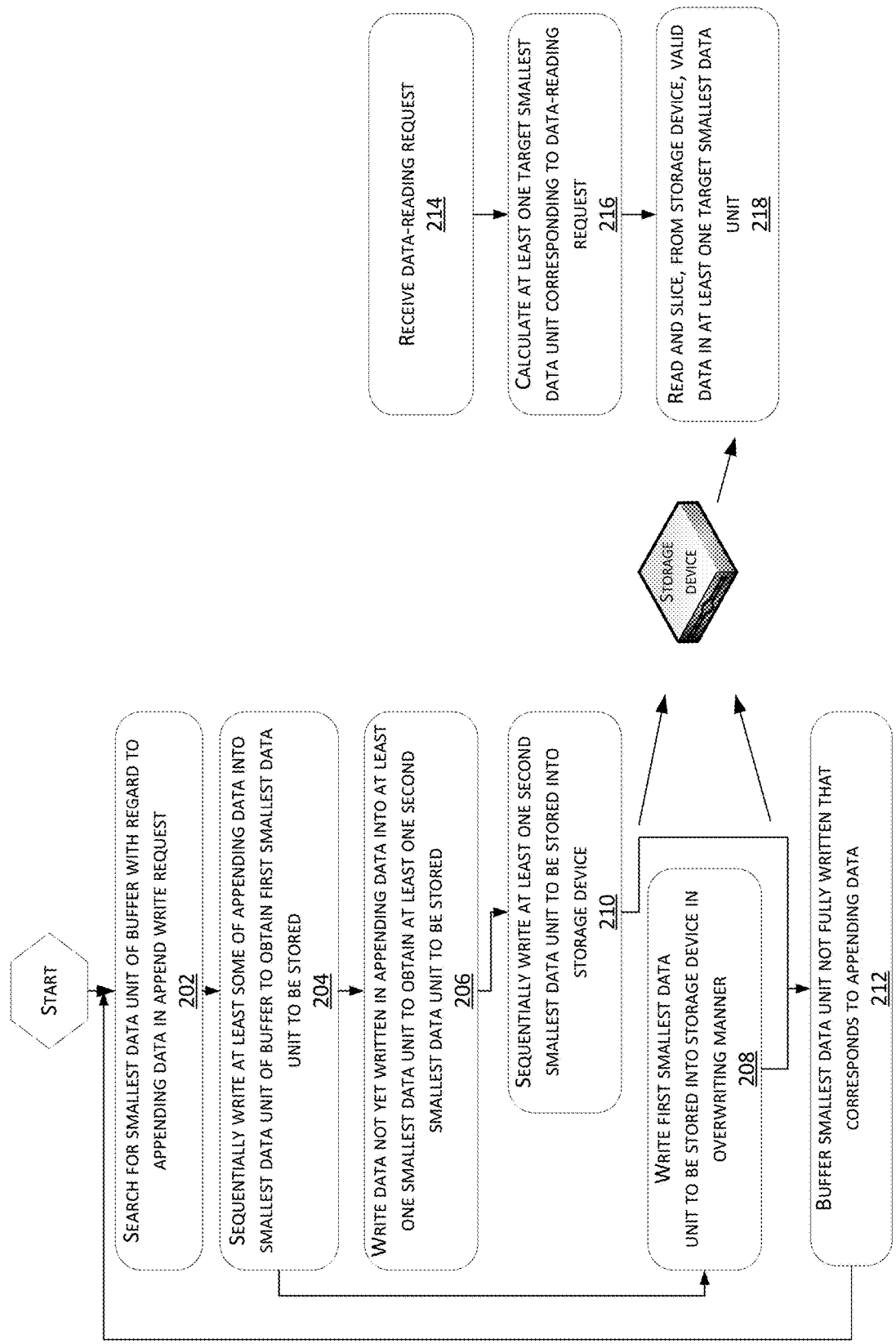
FIG. 2 shows a flowchart of another example embodiment of a data processing method provided by the present disclosure.

The data processing method in the example embodiment shown in FIG. 1 is mainly introduced from the perspective of data writing process. The data is written into the storage device according to the data processing method in the example embodiment shown in FIG. 1; when the data is read from the storage device, the storage position of the data may be located through calculation. As shown in FIG. 2, a flowchart of another example embodiment of a data processing method according to an example embodiment of the present disclosure is illustrated. The method may comprise the following steps:

202: search for a smallest data unit of a buffer with regard to appending data in an append write request.

204: sequentially write at least some of the appending data into the smallest data unit of the buffer to obtain a first smallest data unit to be stored.

206: write data not yet written in the appending data into at least one smallest data unit to obtain at least one second smallest data unit to be stored.

208: write the first smallest data unit to be stored into the storage device in an overwriting manner.

210: sequentially write the at least one second smallest data unit to be stored into the storage device.

212: buffer a smallest data unit not fully written that corresponds to the appending data.

Reference regarding the operations for steps 202 to 212 may be made to the operations described for steps 102 to 112 in the above example embodiment. Details are not repeated herein.

214: receive a data-reading request.

Herein, the data-reading request may be sent by a requestor.

216: calculate, based on a first fixed length of the smallest data unit, at least one target smallest data unit corresponding to the data-reading request;

for example, a request start position and a request offset corresponding to the data-reading request may be determined first.

Each data-reading request may carry the request start position and the request offset.

The request offset may refer to a data length of the object requested to be read.

Based on the request start position, a start boundary of any smallest data unit may be located; based on the request offset and the first fixed length of the smallest data unit, a number of smallest data units that need to be read may be calculated; thus, at least one target smallest data unit may be obtained through calculation by combining the request start position, the request offset, and the first fixed length.

Assuming that the start position of the data file in the storage device is 0K (kilobytes); the append write operation regarding the data file starts at the start position; and assuming that the request start position of a data-reading request is 8K, the first fixed length is 4K, and a requested read length is 12K, then it can be seen that the operation needs to start at the 8K position, read 12K/4K=3 target smallest data units, and the request end position is 8K+12K, which is 20K.

Since the smallest data unit is the smallest unit for reading data from and writing data into the storage device, a start boundary of a certain smallest data unit may be located according to the request start position, and an end boundary of a certain smallest data unit may be located according to the length of the object requested to be read.

218: read and slice, from the storage device, valid data in the at least one target smallest data unit.

After the at least one target smallest data unit is determined, the valid data in the at least one target smallest data unit may be read from the storage device, and the at least one target smallest data unit is spliced in accordance with the storage order to form a larger data, and is fed back to the requestor.

In this example embodiment, the index relationship between the data and the storage position does not need to be established; and the storage position of the data may be located through calculation, which improves the operation convenience.

In example embodiments, the smallest data unit may include a data storage area and a metadata description area located at the end of the data storage area. Appending data is written into the data storage area, and metadata of the appending data generates the metadata description area. The metadata is generated based on the received appending data, and may be used to indicate relevant information, such as the attributes, of the appending data.

The length of the smallest data unit is fixed, and the lengths of the data storage area and data description area thereof are also fixed. The appending data is written into the data storage area, which is the valid data of the smallest data unit. The length of the smallest data unit is a first fixed length; the length of the data storage area is a second fixed length; and the length of the metadata description area is a third fixed length, wherein the first fixed length is equal to the sum of the second fixed length and the third fixed length.

Figure 3:
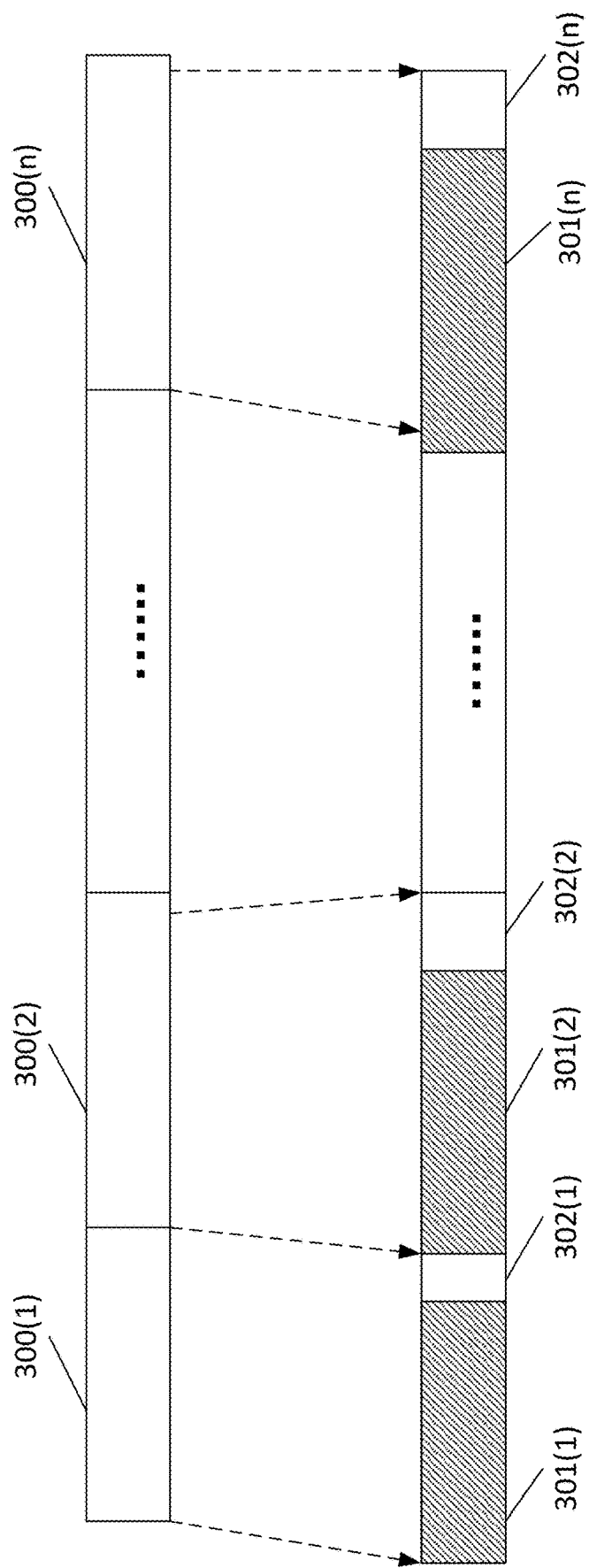
FIG. 3 shows a schematic structural diagram of a smallest data unit according to an example embodiment of the present disclosure.

As shown in the schematic structure diagram of the smallest data unit in FIG. 3, each smallest data unit such as 300(1), 300(2), . . . , 300(n) is composed of a data storage area such as 301(1), 301(2), . . . , 301(n) and a metadata description area such as 302(1), 302(2), . . . , 302(n) respectively; and the metadata description area such as 302(n) is located at the end of the data storage area 301(n), wherein n may be any integer.

The data storage area such as 301(n) stores therein the valid data, i.e., data requested to be written, which is as the shaded portion in FIG. 3; the metadata description area such as 302(n) is used to store the metadata of the valid data.

Therefore, in example embodiments, the append writing at least some of the appending data into the smallest data unit of the buffer to obtain a first smallest data unit to be stored, and writing data not yet written in the appending data into at least one smallest data unit to obtain at least one second smallest data unit to be stored may comprise:

append writing at least some of the appending data into the data storage area in the smallest data unit of the buffer; and modifying, based on the at least some data, the metadata description area in the smallest data unit of the buffer to obtain the first smallest data unit to be stored; and writing data not yet written in the appending data into a data storage area of at least one smallest data unit; and generating, based on data written in each data storage area, a corresponding metadata description area for each data storage area, so as to obtain at least one second smallest data unit to be stored.

In this example embodiment, the appending data and the metadata thereof are packaged together to form an independent data format. Only one write operation is needed to write the appending data and metadata, which not only reduces the write frequencies, the write operation efficiency is also enhanced.

For example, if the smallest data unit includes a data storage area and a metadata description area, in example embodiments, the read, from the storage device, valid data in the at least one target smallest data unit and splice the same may comprise:

reading, from the storage device, valid data in the data storage area of the at least one target smallest data unit and splicing the same.

In addition, when the valid data in the data storage area of the at least one target smallest data unit is read, parity check may be performed on valid data in each target smallest data unit to verify whether the data is complete and accurate, etc.;

if the parity check is successful, the valid data in the data storage area of at least one target smallest data unit is spliced.

In order to facilitate the parity check, for example, the metadata in the metadata description area may include a data checksum of the valid data. In other words, the data checksum is calculated based on the data written into the data storage area, and the data checksum is used as the metadata to be stored in the metadata description area.

The data checksum may be calculated using a CRC (Cyclical Redundancy Check) algorithm. Details are not repeated herein.

Therefore, the reading, from the storage device, valid data in the data storage area of the at least one target smallest data unit and splicing the same may comprise:

reading, from the storage device, valid data in the data storage area of the at least one target smallest data unit;

performing parity check on the valid data read from the data storage area of each target smallest data unit based on the data checksum of the metadata description area of each target smallest data unit;

if the parity check for all the valid data in the data storage area of the at least one target smallest data unit is successful, the valid data in the data storage area of at least one target smallest data unit is spliced.

In addition, the appending data in one append write request may be divided into at least one smallest data unit to be written into the storage device. During the write operation, write operation failures might occur due to, for example, a process crashing abnormally, a machine restarting because of power down, and the like. After the process restarts, data recovery is required. When the data is to be recovered, request atomicity will need to be ensured; that is, operations for one append write request are either all successful or all failures, which also means that at least one smallest data unit corresponding to one append write request is all written either successfully or unsuccessfully, such that after a process restarts due to a write operation failure, the data may be recovered to the boundary of any append write request, thus ensuring the atomicity of the append write request.

In order to guarantee the request atomicity, in example embodiments, the metadata may comprise therein a valid data length after a last but one write operation, a valid data length after a last write operation, and whether data last written and at least some data in a next smallest data unit belong to a same append write request;

additionally, to facilitate the parity check, a data checksum after the last but one write operation and a data checksum after the last write operation may further be included.

Naturally, the metadata must further include some other attribute information related to the service. Details are not repeated herein.

In other words, each metadata description area may include at least the following fields:

prevSize, which represents the valid data length after the last but one write operation in the smallest data unit;

prevCrc, which represents the data checksum of the valid data in the smallest data unit after the last but one write operation in the smallest data unit, i.e., the data checksum of the data stored in the data storage area;

currSize, which represents the valid data length after the last write operation in the smallest data unit;

currCrc, which represents the data checksum of the valid data in the smallest data unit after the last write operation in the smallest data unit, i.e., the data checksum of the data stored in the data storage area; and hasMore, which indicates whether the last written data of the smallest data unit and at least some data in the next smallest data unit belong to the same append write request.

Therefore, in example embodiments, if a data recovery instruction is detected and data recovery is required, a data recovery length of a data file may be recovered to a data end position of any append write request based on the valid data length after the last but one write operation in each of the smallest data unit, the valid data length after the last write operation, and whether the data last written and at least some data in the next smallest data unit belong to the same append write request, thus maintaining the atomicity.

Through determining whether the data describing the last written data recorded in the metadata description area and the at least some of the data in the next smallest data unit belong to the same append write request field, it can be determined whether two consecutive append write requests correspond to the same smallest data unit. As a result, during the data recovery process, identifying a data end boundary of any append write request may be guaranteed; and based on the valid data length after the last but one write operation or the valid data length after the last write operation, the data file may then be recovered to the data end boundary of any append write request, thereby ensuring the request atomicity.

Figure 4:
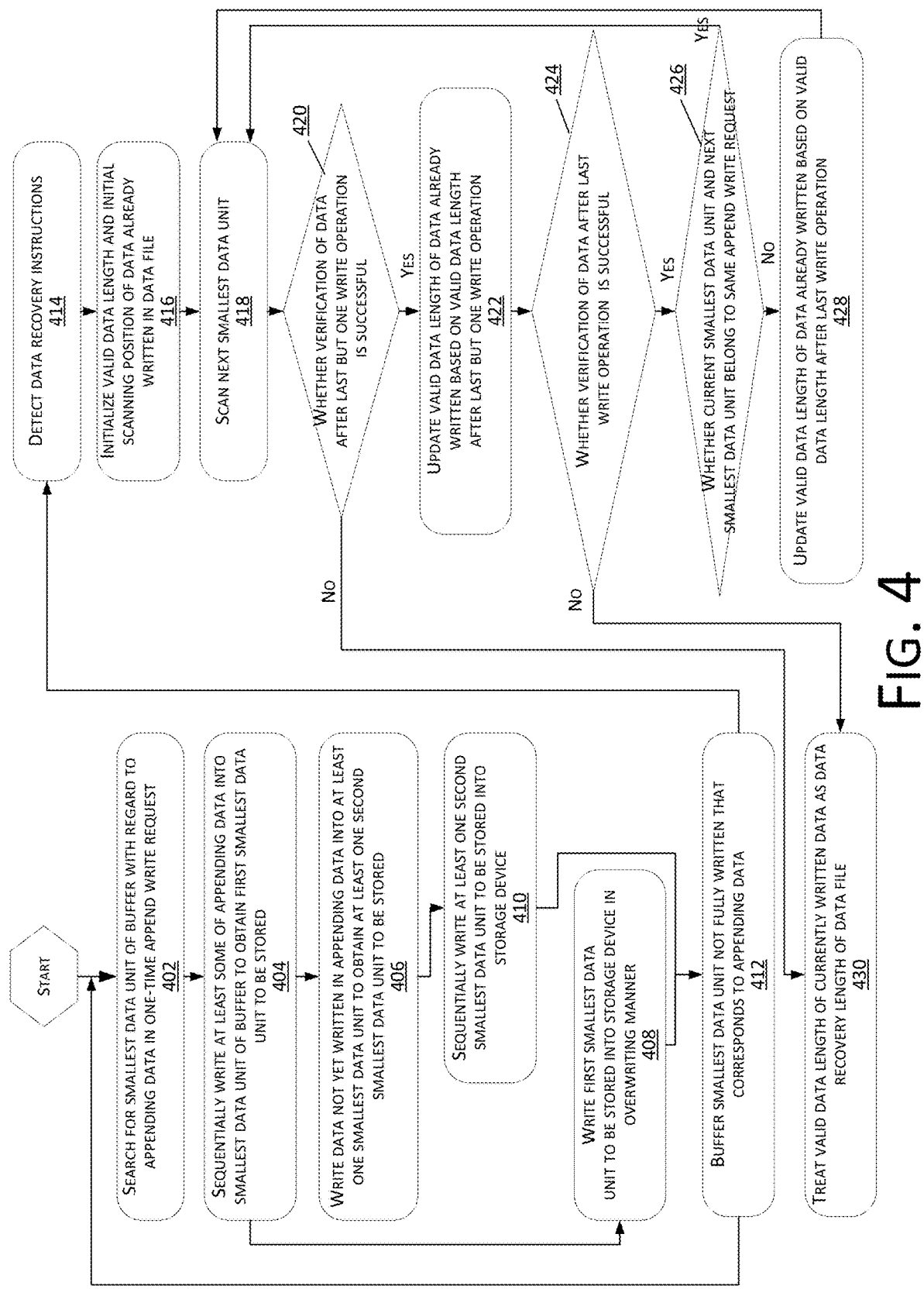
FIG. 4 shows a flowchart of another example embodiment of a data processing method provided by the present disclosure.

For example, referring to FIG. 4, which is a flowchart of another example embodiment of a data processing method according to an example embodiment of the present disclosure. The method may comprise the following steps:

402: search for a smallest data unit of a buffer with regard to appending data in an append write request.

404: sequentially write at least some of the appending data into the smallest data unit of the buffer to obtain a first smallest data unit to be stored.

406: write data not yet written in the appending data into at least one smallest data unit to obtain at least one second smallest data unit to be stored.

408: write the first smallest data unit to be stored into the storage device in an overwriting manner.

410: sequentially write the at least one second smallest data unit to be stored into the storage device.

412: buffer a smallest data unit not fully written that corresponds to the appending data.

Reference regarding the operations for steps 402 to 412 may be made to the operations described for steps 102 to 112 in the above example embodiment. Details are not repeated herein.

414: detect data recovery instructions.

The data recovery instruction may be automatically triggered when a write operation failure is detected, or may be triggered manually.

416: initialize data already written in a data file such that a valid data length thereof is initialized to zero and an initial scanning position such that the initial scanning position is initialized to a start position of the data file in the storage device.

Since a write operation failure may occur at any time during a write operation, the operation of step 414 is not limited to the operation sequence in this example embodiment, and it may be performed after or before any one of steps 402 to 412 or simultaneously.

418: scan the next smallest data unit.

420: whether verification of data in the smallest data unit after the last but one write operation is successful or not; if so, step 422 is executed; and if not, step 430 is executed.

The metadata description area may store the data checksum after the last but one write operation; as a result, whether the parity check performed on the data after the last but one write operation is successful or not may be determined based on the data checksum after the last but one write operation.

422: update the valid data length of the data already written based on a valid data length after the last but one write operation.

424: whether verification of data after the last write operation is successful or not; if so, step 426 is executed; and if not, step 430 is executed.

The metadata description area may store the data checksum after the last write operation; as a result, whether the parity check performed on the data after the last write operation is successful or not may be determined based on the data checksum after the last write operation.

426: detect whether the current smallest data unit and the next smallest data unit belong to the same append write request; if so, return to step 418 to resume execution; and if not, execute step 428.

If the current smallest data unit and the next smallest data unit belong to the same append write request, it indicates that the last written data in the current smallest data unit is not the data end position of the append write request; it is thus necessary to continue scanning to find the request boundary.

428: update the valid data length of the data already written based on a valid data length after the last write operation, and return to step 418 to resume execution.

430: treat the valid data length of the currently written data as the data recovery length of the data file.

If the parity check performed on the data after the last write operation of any smallest data unit fails, but the parity check performed on the data after the last but one write operation succeeds, it indicates that the last but one write operation and the last write operation do not belong to the same append write request. At this time, if the parity check performed on the data after the last write operation fails, the valid data length of the data already written obtained based on updating the valid data length after the last but one write operation may be used as the recovery length of the data file.

In this example embodiment, if a write operation failure is present, data recovery may be used to ensure the request atomicity, thereby restoring the data file to the data end position of any append write request. Thus, the technical solution of the example embodiment of the present disclosure may not only guarantee the write operation efficiency, improve the write operation convenience, but it may also ensure the request atomicity.

In addition, in example embodiments, if the data after the last write operation in any smallest data unit fails the parity check, after the last written data is deleted, the any smallest data unit may be buffered to ensure that the execution for the append write operation may be continued.

In one or a plurality of the above example embodiments, the sequentially writing data not yet written in the appending data into a data storage area of at least one smallest data unit may comprise:

writing data not yet written in the appending data into a data storage area of at least one smallest data unit;

if a data storage area of any smallest data unit is not fully written with data, filling the data storage area with preset characters at an end of the data written in the data storage area of any smallest data unit; and the sequentially writing at least some of the appending data into the data storage area in the smallest data unit of the buffer comprises:

writing at least some of the appending data to a position of the preset characters in the data storage area of the smallest data unit of the buffer, so as to replace the preset characters.

For example, the preset character may be a character 0 or a null character.

In one or a plurality of the above example embodiments, the writing the first smallest data unit to be stored into a storage device in an overwriting manner may comprise:

determining, based on a write start position of the append write request and the first fixed length of the smallest data unit, a position where data is to be written; and writing, based on the position where data is to be written, the first smallest data unit to be stored into the storage device in an overwriting manner.

Each append write request carries the write start position, and may further include the length of the data to be written. Therefore, based on the write start position and the first fixed length of the smallest data unit, the position of the previous smallest data unit may be found and used as the position where data is to be written, such that the first smallest data unit to be stored may be written into the storage device and overwrites the previous smallest data unit.

Figure 5:
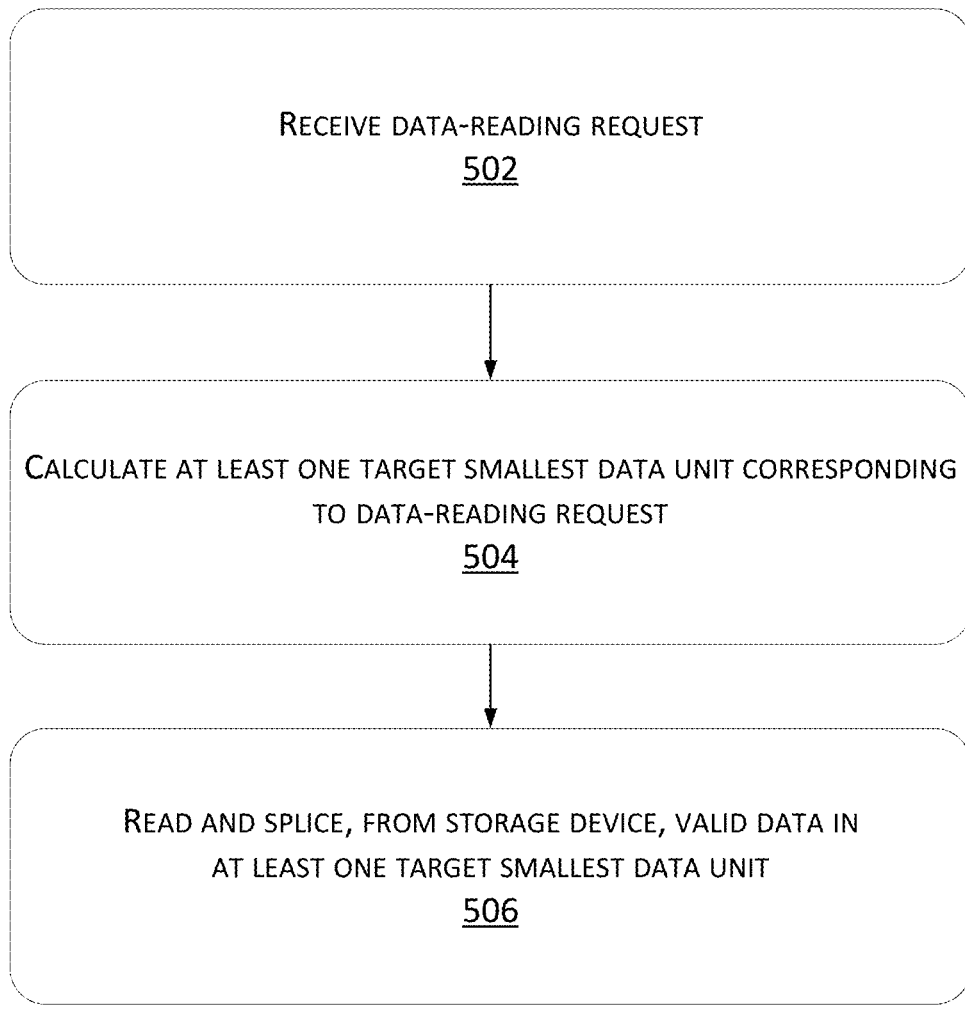
FIG. 5 shows a flowchart of still another example embodiment of a data processing method provided by the present disclosure.

FIG. 5 is a flowchart of still another example embodiment of a data processing method according to an example embodiment of the present disclosure. This example embodiment is described from the perspective of a data acquisition process. The method may comprise the following steps:

502: receive a data-reading request.

504: calculate, based on a first fixed length of a smallest data unit, at least one target smallest data unit corresponding to the data-reading request;

506: read, from a storage device, valid data in the at least one target smallest data unit and splice the same.

Herein, valid data written in each smallest data unit comprises at least some appending data in an append write request or at least some appending data in an append write request and at least some appending data in a next append write request.

Reference regarding the generation and writing processes of each smallest data unit may be made to the example embodiment shown in FIG. 1 above. Details are not repeated herein.

For example, in example embodiments, the calculate, based on a first fixed length of a smallest data unit, at least one target smallest data unit corresponding to the data-reading request comprises:

determining a request start position and a request offset corresponding to the data-reading request;

calculating, based on the first fixed length of the smallest data unit, the request start position, and the request offset, at least one target smallest data unit corresponding to the read request.

For example, in example embodiments, the smallest data unit may comprise a data storage area and a metadata description area located at an end of the data storage area, wherein the data storage area is used to store valid data and the metadata description area is used to store metadata of the valid data; and the read, from a storage device, valid data in the at least one target smallest data unit and splice the same comprises:

reading, from a storage device, valid data in the data storage area of the at least one target smallest data unit and splicing the same.

The metadata may further include a data checksum after the last but one write operation and a data checksum after the last write operation;

thus, after valid data in the data storage area of the at least one target smallest data unit is read from the storage device, parity check may be performed on the data based on the data checksum after the last but one write operation and the data checksum after the last write operation in each smallest data unit; if the parity checks performed on the data after the last but one write operation and on the data after the last write operation in each smallest data unit are both successful, then the valid data in the data storage area of the at least one target smallest data unit is spliced.

Figure 6:
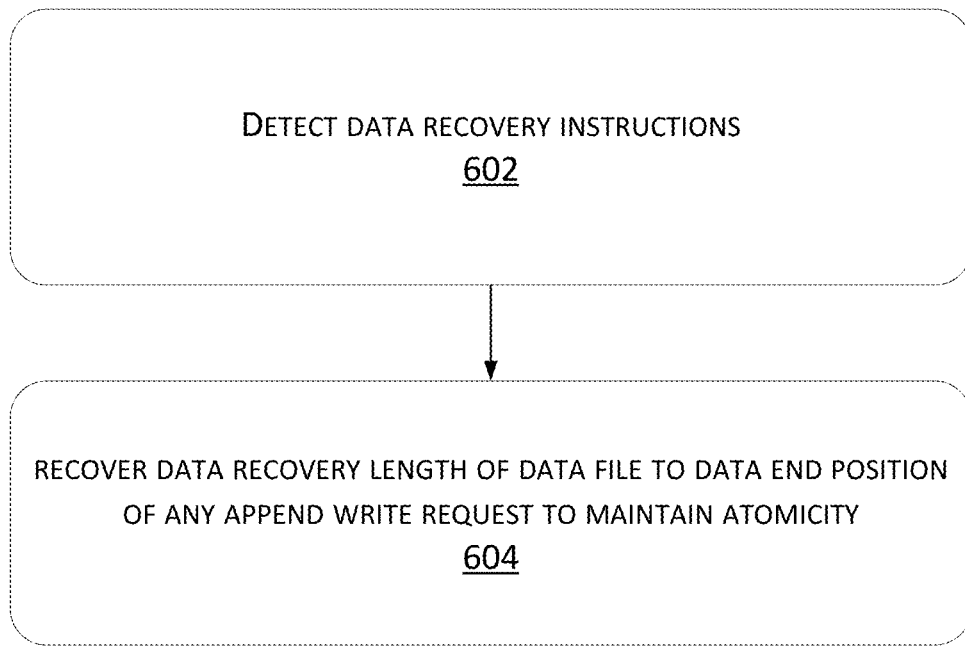
FIG. 6 shows a flowchart of yet still another example embodiment of a data processing method provided by the present disclosure.

FIG. 6 is a flowchart of yet still another example embodiment of a data processing method according to an example embodiment of the present disclosure. This example embodiment is mainly described from the perspective of a data recovery process. The method may comprise the following steps:

602: detect data recovery instructions.

604: recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein the smallest data unit comprises a data storage area and a metadata description area located at an end of the data storage area, wherein the data storage area is used to store valid data and the metadata description area is used to store metadata of the valid data; the valid data comprises at least some appending data in an append write request or at least some appending data in an append write request and at least some appending data in a next append write request.

Reference regarding the generation and writing of each smallest data unit may be made to the data writing process described in the foregoing example embodiments. Details are not repeated herein.

For example, the recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity may comprise:

initializing data already written in a data file such that a valid data length thereof is zero and an initial scanning position such that the initial scanning position is a start position of the data file in the storage device;

scanning the next smallest data unit;

performing parity check on data after the last but one write operation in a current smallest data unit;

if the data after the last but one write operation in the current smallest data unit passes the parity check, updating the valid data length of the data already written based on a valid data length after the last but one write operation in the current smallest data unit;

performing parity check on data after the last write operation in the current smallest data unit;

if the data after the last write operation in the current smallest data unit passes the parity check, detecting whether the current smallest data unit and the next smallest data unit belong to the same append write request;

if so, returning to the step of scanning the next smallest data unit to resume execution;

if not, updating, based on a valid data length after the last write operation in the current smallest data unit, the valid data length of the data already written and returning to the step of scanning the next smallest data unit to resume execution; and if the data after the last but one write operation or the data after the last write operation in any smallest data unit fails the parity check, treating the currently written valid data length as the data recovery length of the data file.

For example, the metadata description area may store the data checksum after the last but one write operation; as a result, whether the parity check performed on the data after the last but one write operation is successful or not may be determined based on the data checksum after the last but one write operation.

For example, metadata description area may store a data checksum after the last write operation; as a result, whether the parity check performed on the data after the last write operation is successful or not may be determined based on the data checksum after the last write operation.

In the technical solutions of the example embodiments of the present disclosure, the appending data is written into the storage device together with the metadata of the appending data, thereby reducing the write operation frequencies and ensuring the write operation efficiency. The appending data is reorganized according to the fixed data format of the smallest data unit; the index relationship does not need to be maintained; and the position of the data may be located through calculation to implement data reading, thereby ensuring the write operation convenience. In addition, in the example embodiments of the present disclosure, the over-write operation is adopted and whether two consequent append write requests correspond to the same smallest data unit is recorded; thus, the data end boundary of the append write request may be identified, thereby ensuring the request atomicity during data recovery.

Figure 7:
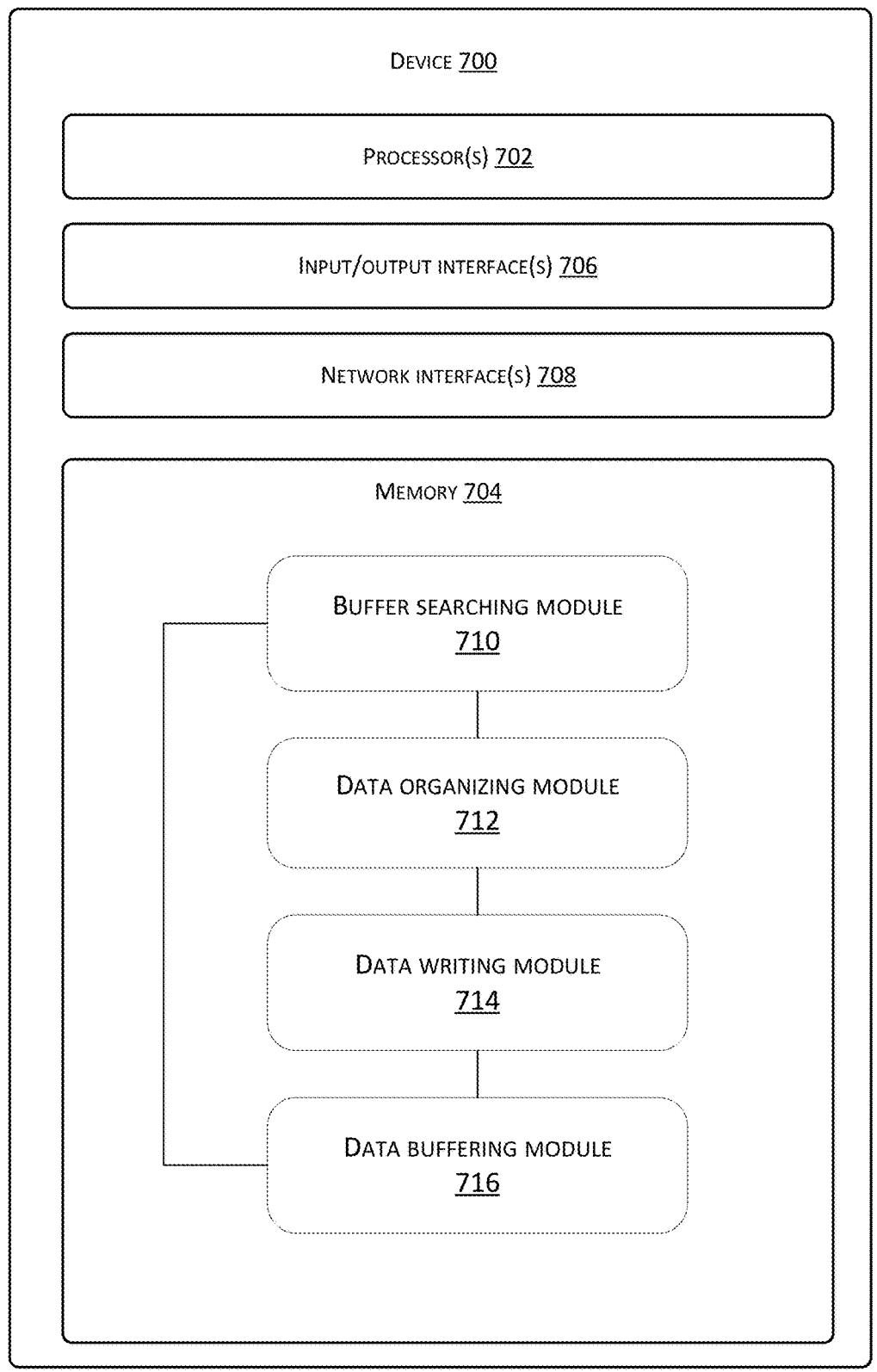
FIG. 7 is a schematic structural diagram of an example embodiment of a data processing device provided by the present disclosure.

FIG. 7 is a schematic structural diagram of an example embodiment of a data processing device according to an example embodiment of the present disclosure.

As shown in FIG. 7, the device 700 includes one or more processor(s) 702 or data processing unit(s) and memory 704. The device 700 may further include one or more input/output interface(s) 706 and one or more network interface(s) 708.

The memory 704 is an example of computer readable storage media.

Computer readable storage medium or media include both permanent and non-permanent, removable and non-removable media, may store, by any method or technology, information. The information may be computer readable instructions, data structures, modules of programs, or other data. Examples of computer readable storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer readable storage media do not include transitory media such as modulated data signals and carriers.

The memory 704 may store therein a plurality of the following modules or units including:

a buffer searching module 710, configured to search for a smallest data unit of a buffer with regard to appending data in an append write request;

a data organizing module 712, configured to sequentially write at least some of the appending data into the smallest data unit of the buffer to obtain a first smallest data unit to be stored, and write data not yet written in the appending data into at least one smallest data unit to obtain at least one second smallest data unit to be stored;

a data writing module 714, configured to write the first smallest data unit to be stored into a storage device in an overwriting manner, and sequentially write the at least one second smallest data unit to be stored into the storage device; and a data buffering module 716, configured to buffer a smallest data unit not fully written that corresponds to the appending data.

In example embodiments, the device 700 may further comprise the following modules (not shown in FIG. 7) stored in the memory 704:

a request receiving module, configured to receive a data-reading request;

a calculation module, configured to calculate, based on a first fixed length of a smallest data unit, at least one target smallest data unit corresponding to the data-reading request.

For example, the calculation module may be used to determine a request start position and a request offset corresponding to the data-reading request; and calculate, based on the first fixed length of the smallest data unit, the request start position, and the request offset, at least one target smallest data unit corresponding to the read request.

In example embodiments, the smallest data unit comprises a data storage area and a metadata description area located at an end of the data storage area; the metadata description area is used to store metadata;

the data organizing module may be used for:

sequentially writing at least some of the appending data into the data storage area in the smallest data unit of the buffer, and modifying, based on the at least some data, the metadata description area in the smallest data unit of the buffer to obtain the first smallest data unit to be stored; and writing data not yet written in the appending data into a data storage area of at least one smallest data unit, and generating, based on data written in each data storage area, a corresponding metadata description area for each data storage area, so as to obtain at least one second smallest data unit to be stored.

The metadata may at least comprise a valid data length after a last but one write operation, a valid data length after a last write operation, and whether data last written and at least some data in a next smallest data unit belong to a same append write request;

In example embodiments, the device 700 may further comprise the following modules (not shown in FIG. 7) stored in the memory 704:

a fault detection module, configured to detect data recovery instructions;

a data recovery module, configured to recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity.

For example, the data recovery module may be used for:

initializing data already written in a data file such that a valid data length thereof is zero and an initial scanning position such that the initial scanning position is a start position of the data file in the storage device;

scanning the next smallest data unit;

performing parity check on data after the last but one write operation in a current smallest data unit;

if the data after the last but one write operation in the current smallest data unit passes the parity check, updating the valid data length of the data already written based on a valid data length after the last but one write operation in the current smallest data unit;

performing parity check on data after the last write operation in the current smallest data unit;

if the data after the last write operation in the current smallest data unit passes the parity check, detecting whether the current smallest data unit and the next smallest data unit belong to the same append write request;

if so, returning to the step of scanning the next smallest data unit to resume execution;

if not, updating, based on a valid data length after the last write operation in the current smallest data unit, the valid data length of the data already written and returning to the step of scanning the next smallest data unit to resume execution; and if the data after the last but one write operation or the data after the last write operation in any smallest data unit fails the parity check, treating the currently written valid data length as the data recovery length of the data file.

In example embodiments, the metadata may further include a data checksum after the last but one write operation and a data checksum after the last write operation;

The data recovery module performing parity check on the data after the last but one write operation in the current smallest data unit may perform the parity check on the data after the last but one write operation based on the data checksum of the last but one write operation in the current smallest data unit; and the data recovery module performing parity check on the data after the last write operation in the current smallest data unit may perform the parity check on the data after the last write operation based on the data checksum after the last write operation in the current smallest data unit.

In example embodiments, the device 700 may further comprise the following modules (not shown in FIG. 7) stored in the memory 704:

a buffer triggering module, configured to, if data after the last write operation in any smallest data unit fails the parity check, delete the last written data and buffer the any smallest data unit.

For example, in example embodiments, the data organizing module writing data not yet written in the appending data into a data storage area of at least one smallest data unit may write data not yet written in the appending data into a data storage area of at least one smallest data unit; if a data storage area of any smallest data unit is not fully written with data, filling the data storage area with preset characters at an end of the data written in the data storage area of any smallest data unit;

the data writing module sequentially writing at least some of the appending data into the data storage area in the smallest data unit of the buffer may write at least some of the appending data to a position of the preset characters in the data storage area of the smallest data unit of the buffer, so as to replace the preset characters.

In example embodiments, the data writing module writing the first smallest data unit to be stored into a storage device in an overwriting manner may determine a position where data is to be written based on a write start position of the append write request and the first fixed length of the smallest data unit; and writing the first smallest data unit to be stored into the storage device in an overwriting manner based on the position where data is to be written.

For example, the data processing device of the example embodiment shown in FIG. 7 may be implemented as a computer device. In a distributed storage system, the computer device may deploy data storage nodes and the like of the distributed storage system. The data storage nodes are the nodes responsible for processing data-writing requests or data-reading requests in the distributed storage system. The distributed storage system consists of a plurality of data storage nodes.

Figure 8:
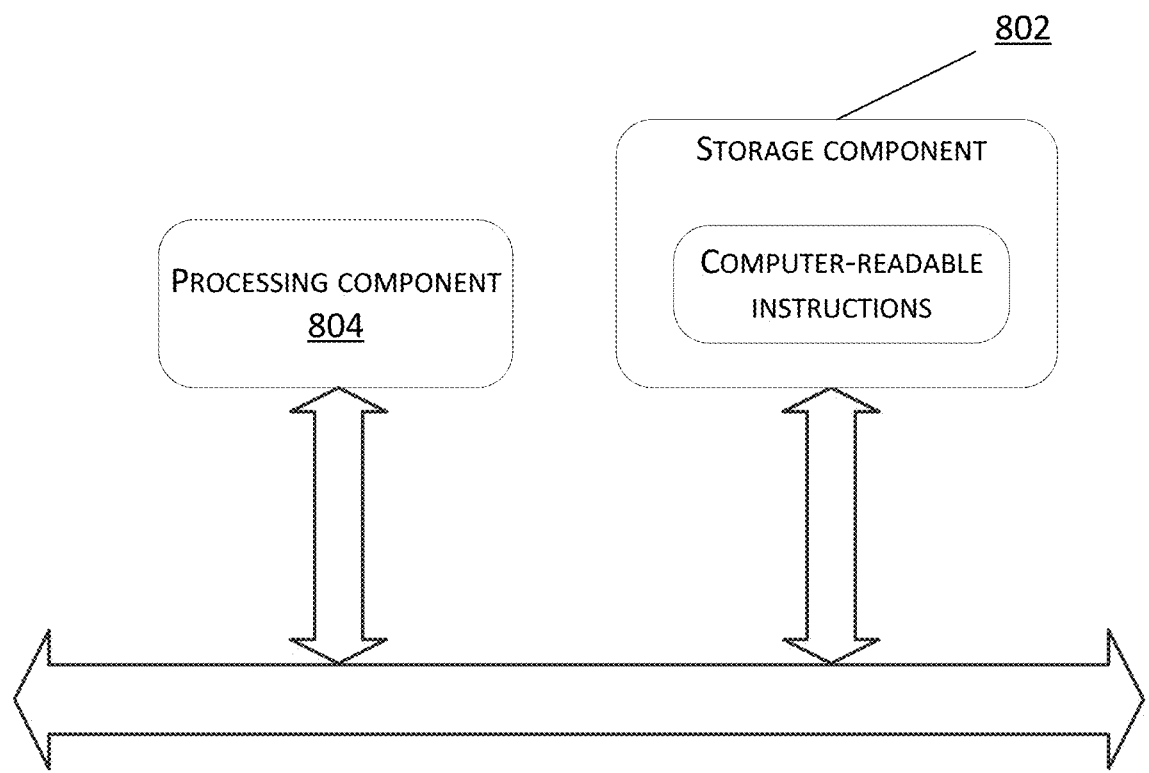
FIG. 8 is a schematic structural diagram of an example embodiment of a computer device provided by the present disclosure.

As shown in FIG. 8, the computer device may include a storage component 802 and a processing component 804;

the storage component 802 is configured to store one or a plurality of computer-readable instructions, wherein the one or plurality of computer-readable instructions are called and executed by the processing component 804.

The processing component 804 is configured to:

search for a smallest data unit of a buffer with regard to appending data in an append write request;

sequentially write at least some of the appending data into the smallest data unit of the buffer to obtain a first smallest data unit to be stored, and write data not yet written in the appending data into at least one smallest data unit to obtain at least one second smallest data unit to be stored;

write the first smallest data unit to be stored into a storage device in an overwriting manner, and sequentially write the at least one second smallest data unit to be stored into the storage device; and buffer a smallest data unit not fully written that corresponds to the appending data.

Herein, the smallest data unit not fully written that corresponds to the appending data may be buffered in the storage component 802.

The storage device may be an external storage medium of the computer device, or may be referring to the storage component 802 in some implementation scenarios.

For example, the processing component may further execute the data processing methods described in any of the example embodiments shown from FIG. 1 to FIG. 4.

The processing component 804 may comprise one or a plurality of processors to execute computer-readable instructions so as to implement all or some of the steps in the above methods. Certainly, the processing component may also be one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to implement the above methods.

The storage component 802 is configured to store various types of data to support operations on the computer device. The storage component may be implemented using any type of volatile or non-volatile storage devices or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

Certainly, the computer device must necessarily further include other components, such as input/output interfaces, communication components, and so on.

The input/output interface provides an interface between the processing component and a peripheral interface module. The peripheral interface module may be an output device, an input device, or the like.

The communication component is configured to facilitate wired or wireless communication between the computer device and other devices, such as communication with a requestor.

An example embodiment of the present disclosure further provides a computer-readable storage medium having stored therein a computer program which, when executed by a computer, implements the afore-mentioned data processing methods of any of the example embodiments shown from FIG. 1 to FIG. 3.

Figure 9:
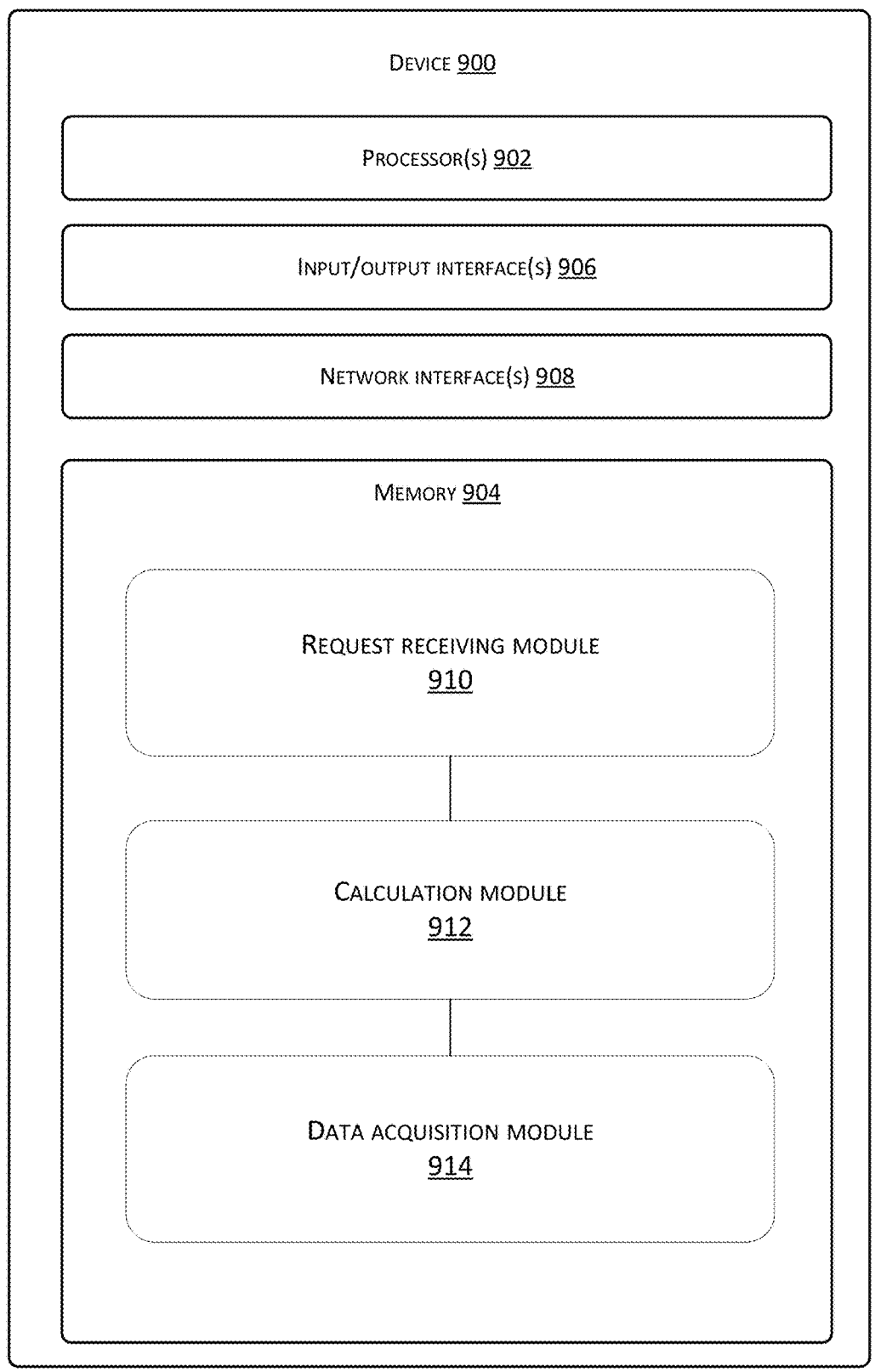
FIG. 9 shows a schematic structural diagram of another example embodiment of a data processing device provided by the present disclosure.

FIG. 9 is a schematic structural diagram of still another example embodiment of a data processing device according to an example embodiment of the present disclosure.

As shown in FIG. 9, the device 900 includes one or more processor(s) 902 or data processing unit(s) and memory 904. The device 900 may further include one or more input/output interface(s) 906 and one or more network interface(s) 908.

The memory 904 is an example of computer readable storage media.

The memory 904 may store therein a plurality of the following modules or units including:

a request receiving module 910, configured to receive a data-reading request;

a calculation module 912, configured to calculate, based on a first fixed length of a smallest data unit, at least one target smallest data unit corresponding to the data-reading request;

a data acquisition module 914, configured to read, from a storage device, valid data in the at least one target smallest data unit and splice the same.

The data obtained after splicing may be fed back to the requestor.

Herein, valid data written in each smallest data unit comprises at least some appending data in an append write request or at least some appending data in an append write request and at least some appending data in a next append write request.

In example embodiments, the calculation module 912 may be used for:

determining a request start position and a request offset corresponding to the data-reading request;

calculating, based on the first fixed length of the smallest data unit, the request start position, and the request offset, at least one target smallest data unit corresponding to the read request.

In example embodiments, the smallest data unit comprises a data storage area and a metadata description area located at an end of the data storage area, wherein the data storage area is used to store valid data and the metadata description area is used to store metadata of the valid data;

the read, from a storage device, valid data in the at least one target smallest data unit and splice the same comprises:

reading, from a storage device, valid data in the data storage area of the at least one target smallest data unit and splicing the same.

For example, the data processing device of the example embodiment shown in FIG. 9 may be implemented as a computer device. In a distributed storage system, the computer device may deploy data storage nodes and the like of the distributed storage system.

Figure 10:
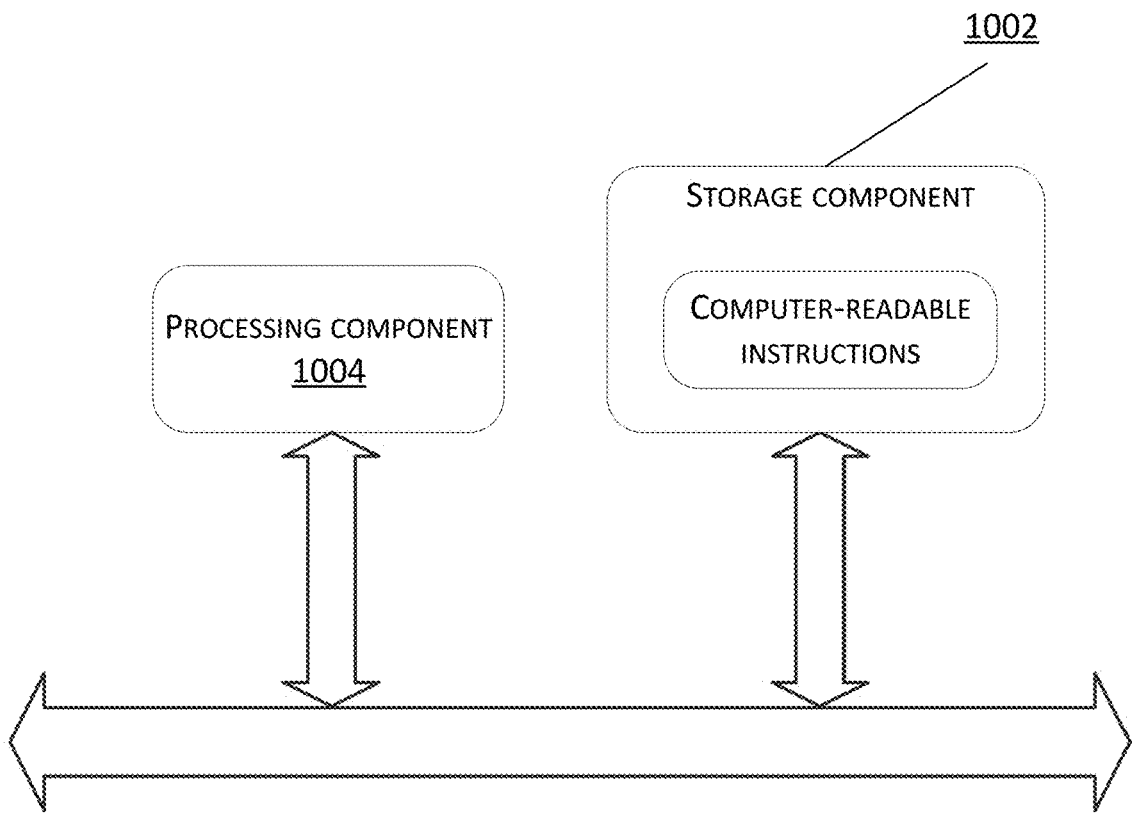
FIG. 10 shows a schematic structural diagram of still another example embodiment of a computer device provided by the present disclosure.

As shown in FIG. 10, the computer device may include a storage component 1002 and a processing component 1004;

the storage component 1002 is configured to store one or a plurality of computer-readable instructions, wherein the one or plurality of computer-readable instructions are called and executed by the processing component 1004.

The processing component 1004 is configured to:

receive a data-reading request;

calculate, based on a first fixed length of a smallest data unit, at least one target smallest data unit corresponding to the data-reading request; and read, from the storage device, valid data in the at least one target smallest data unit and splice the same, wherein valid data written in each smallest data unit comprises at least some appending data in an append write request or at least some appending data in an append write request and at least some appending data in a next append write request.

The processing component 1004 may comprise one or a plurality of processors to execute computer-readable instructions so as to implement all or some of the steps in the above methods. Certainly, the processing component may also be one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to implement the above methods.

The storage component 1002 is configured to store various types of data to support operations on the computer device. The memory may be implemented using any type of volatile or non-volatile storage devices or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

Certainly, the computer device must necessarily further include other components, such as input/output interfaces, communication components, and so on.

The input/output interface provides an interface between the processing component and a peripheral interface module. The peripheral interface module may be an output device, an input device, or the like.

The communication component is configured to facilitate wired or wireless communication between the computer device and other devices, such as communication with a requestor.

An example embodiment of the present disclosure further provides a computer-readable storage medium having stored therein a computer program which, when executed by a computer, implements the afore-mentioned data processing method of any of the example embodiments shown in FIG. 4.

For example, the computer device shown in FIG. 10 and the computer device shown in 8 may be the same computer device.

Figure 11:
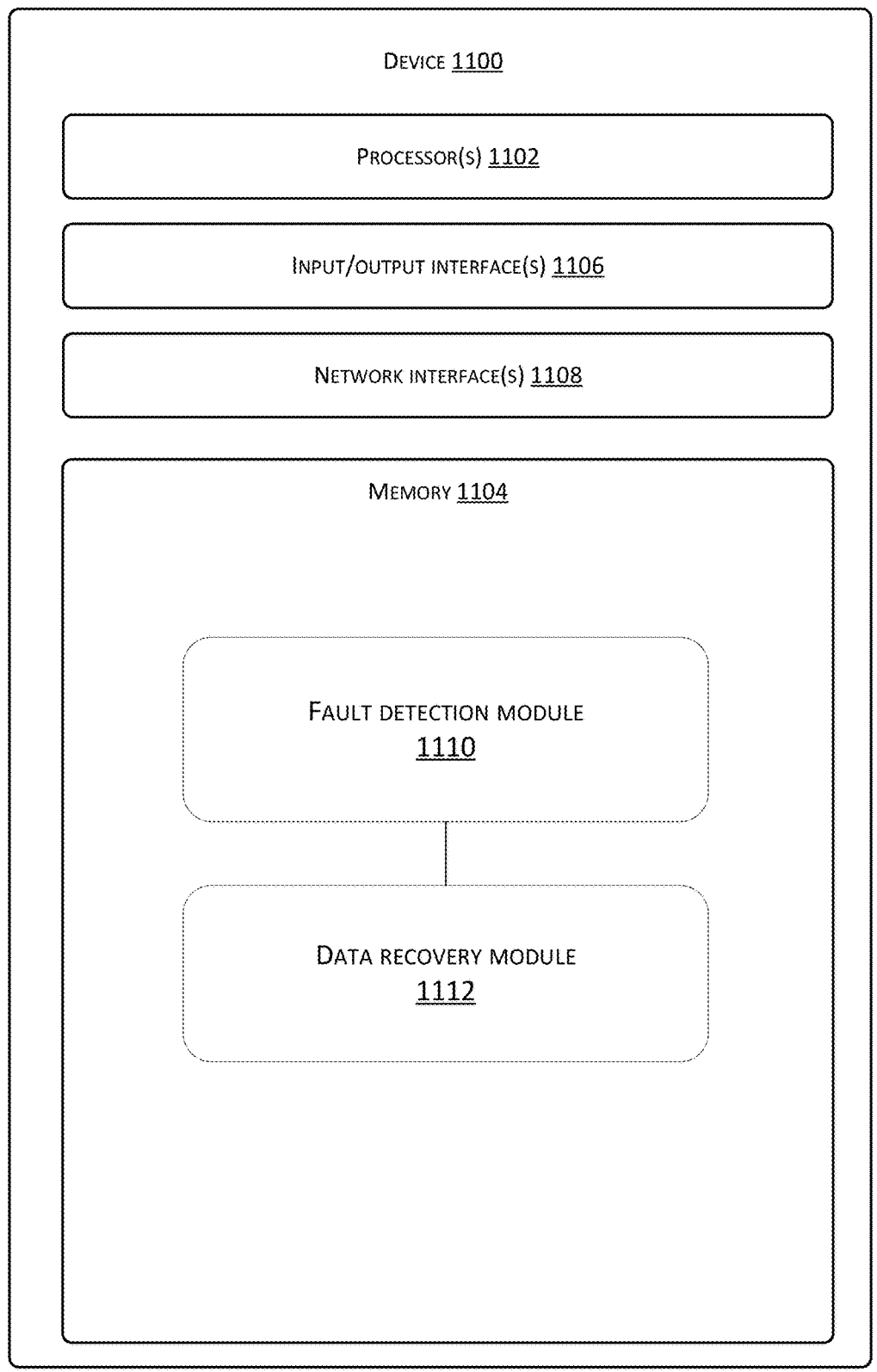
FIG. 11 shows a schematic structural diagram of yet still another example embodiment of a data processing device provided by the present disclosure.

FIG. 11 is a schematic structural diagram of yet another example embodiment of a data processing device according to an example embodiment of the present disclosure.

As shown in FIG. 11, the device 1100 includes one or more processor(s) 1102 or data processing unit(s) and memory 1104. The device 1100 may further include one or more input/output interface(s) 1106 and one or more network interface(s) 1108.

The memory 1104 is an example of computer readable storage media.

The memory 1104 may store therein a plurality of the following modules or units including:

a fault detection module 1110, configured to detect data recovery instructions;

a data recovery module 1112, configured to recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein the smallest data unit comprises a data storage area and a metadata description area located at an end of the data storage area, wherein the data storage area is used to store valid data and the metadata description area is used to store metadata of the valid data; the valid data comprises at least some appending data in an append write request or at least some appending data in an append write request and at least some appending data in a next append write request.

In example embodiments, the data recovery module 1112 may be used for:

scanning the next smallest data unit;

performing parity check on data after the last but one write operation in a current smallest data unit;

if the data after the last but one write operation in the current smallest data unit passes the parity check, updating the valid data length of the data already written based on a valid data length after the last but one write operation in the current smallest data unit;

performing parity check on data after the last write operation in the current smallest data unit;

if the data after the last write operation in the current smallest data unit passes the parity check, detecting whether the current smallest data unit and the next smallest data unit belong to the same append write request;

if so, returning to execute the scanning the next smallest data unit;

if not, updating, based on a valid data length after the last write operation in the current smallest data unit, the valid data length of the data already written and returning to execute the scanning the next smallest data unit; and if the data after the last but one write operation or the data after the last write operation in any smallest data unit fails the parity check, treating the currently written valid data length as the data recovery length of the data file.

For example, the data processing device shown in FIG. 11 may be implemented as a computer device. In a distributed storage system, the computer device may deploy data storage nodes and the like of the distributed storage system.

Figure 12:
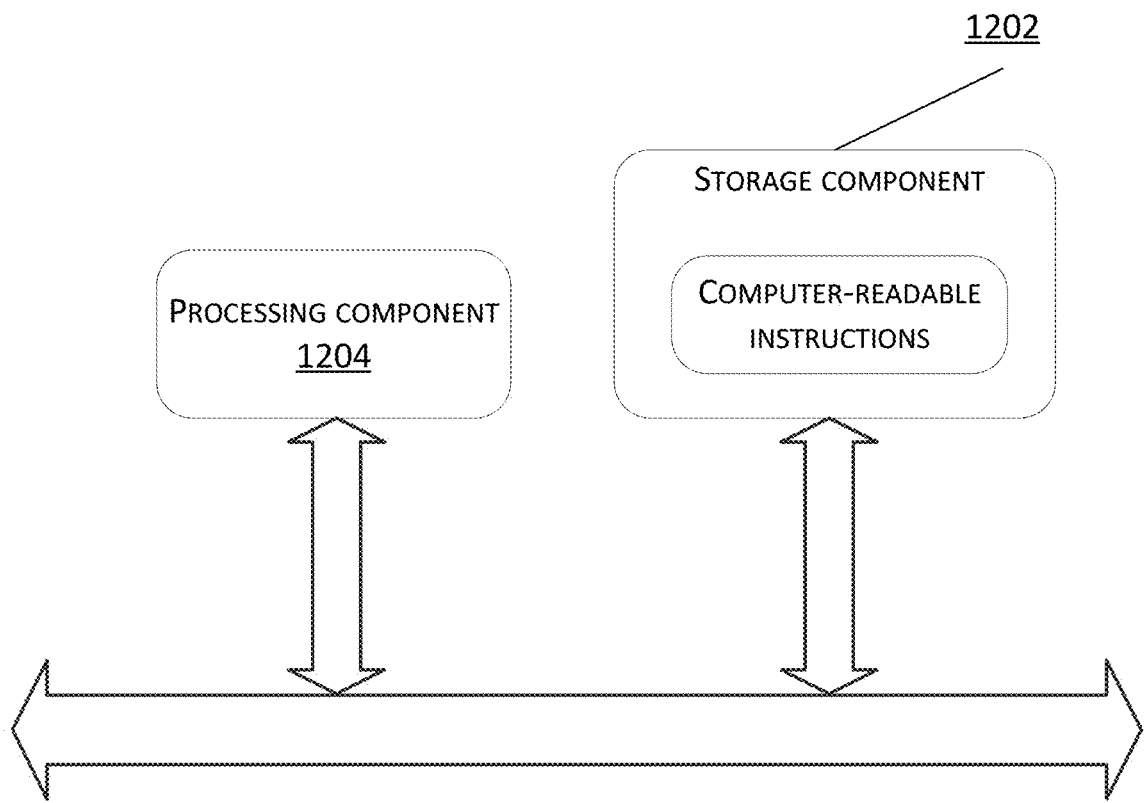
FIG. 12 shows a schematic structural diagram of yet still another example embodiment of a computer device provided by the present disclosure.

As shown in FIG. 12, the computer device may include a storage component 1202 and a processing component 1204;

the storage component 1202 is configured to store one or a plurality of computer-readable instructions, wherein the one or plurality of computer-readable instructions are called and executed by the processing component 1204.

The processing component 1204 is configured to:

detect data recovery instructions;

recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein the smallest data unit comprises a data storage area and a metadata description area located at an end of the data storage area, wherein the data storage area is used to store valid data and the metadata description area is used to store metadata of the valid data; the valid data comprises at least some appending data in an append write request or at least some appending data in an append write request and at least some appending data in a next append write request.

The processing component 1204 may comprise one or a plurality of processors to execute computer-readable instructions so as to implement all or some of the steps in the above methods. Certainly, the processing component may also be one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to implement the above methods.

The storage component 1202 is configured to store various types of data to support operations on the computer device. The memory may be implemented using any type of volatile or non-volatile storage devices or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

Certainly, the computer device must further include other components, such as input/output interfaces, communication components, and so on.

The input/output interface provides an interface between the processing component and a peripheral interface module. The peripheral interface module may be an output device, an input device, or the like.

The communication component is configured to facilitate wired or wireless communication between the computer device and other devices, such as communication with a requestor.

An example embodiment of the present disclosure further provides a computer-readable storage medium having stored therein a computer program which, when executed by a computer, implements the afore-mentioned data processing method shown in FIG. 5.

For example, the computer device shown in FIG. 12, the computer device shown in FIG. 10, and FIG. 8 may be the same computer device.

In the technical solutions of the example embodiments of the present disclosure, the appending data is written into the storage device together with the metadata of the appending data, thereby reducing the write operation frequencies and ensuring the write operation efficiency. The appending data is reorganized according to the fixed data format of the smallest data unit; the index relationship does not need to be maintained; the position of the data may be located through calculation to implement the data reading, thereby ensuring the write operation convenience. In addition, in the example embodiments of the present disclosure, the overwrite operation is adopted and whether two consequent append write requests correspond to the same smallest data unit is recorded; thus, the data end boundary of the append write request may be identified, thereby ensuring the request atomicity during data recovery.

It may be clearly understood by those skilled in the art that, for the purpose of convenient and brief description, reference regarding the detailed working processes of the foregoing systems, devices, and units may be made to the corresponding processes in the foregoing method example embodiments. Details are not repeated herein.

The device example embodiments described above are only examples, wherein the units described as separate components may or may not be physically separated; and the components displayed as units may or may not be physical units; that is, the units may be located in one place, or may be distributed on a plurality of network units. Some or all of the modules may be selected according to actual needs to achieve the object of the solution of the example embodiments. Those of ordinary skill in the art may understand and implement the example embodiments without creative efforts.

Through the description of the above implementations, those skilled in the art may clearly understand that each implementation may be realized by means of software plus a necessary general hardware platform, and may certainly be implemented by hardware. Based on such an understanding, the part of the above technical solution, which is essential or improvement to the prior art, can be embodied in the form of a software product. The computer software product may be stored in a computer-readable storage medium, such as a ROM/RAM, a magnetic disk, or an optical disk, and includes several instructions for enabling a computer device (which may be a personal computer, a server, a network device, or the like) to execute the methods described in each example embodiment or some parts of the example embodiments.

Finally, it should be noted that the above example embodiments are merely used for illustrating, rather than limiting, the technical solutions of the present disclosure. Although the present disclosure is described in detail with reference to the afore-mentioned example embodiments, it should be understood by those of ordinary skill in the art that modifications may still be made to the technical solutions described in the afore-mentioned example embodiments, or equivalent substitutions may be applied to part of the technical features therein; and these modifications or substitutions do not cause the essence of corresponding technical solutions to depart from the spirit and scope of the technical solutions in the example embodiments of the present disclosure.

The present disclosure may further be understood with clauses as follows.

Clause 1. A data processing method comprising:
searching for a smallest data unit of a buffer with regard to appending data in an append write request;
sequentially writing at least some of the appending data into the smallest data unit of the buffer to obtain a first smallest data unit to be stored, and writing data not yet written in the appending data into at least one smallest data unit to obtain at least one second smallest data unit to be stored;
writing the first smallest data unit to be stored into a storage device in an overwriting manner, and sequentially writing the at least one second smallest data unit to be stored into the storage device; and buffering a smallest data unit not fully written that corresponds to the appending data.

Clause 2. The method according to clause 1, further comprising:
receive a data-reading request;
calculating, based on a first fixed length of the smallest data unit, at least one target smallest data unit corresponding to the data-reading request; and
reading and splicing, from the storage device, valid data in the at least one target smallest data unit.

Clause 3. The method according to clause 2, wherein the calculating, based on the first fixed length of the smallest data unit, the at least one target smallest data unit corresponding to the data-reading request comprises:
determining a request start position and a request offset corresponding to the data-reading request; and
calculating, based on the first fixed length of the smallest data unit, the request start position, and the request offset, the at least one target smallest data unit corresponding to the read request.

Clause 4. The method according to clause 1, wherein:
the smallest data unit comprises a data storage area and a metadata description area located at an end of the data storage area, wherein the metadata description area is used to store metadata; and
the sequentially writing the at least some of the appending data into the smallest data unit of the buffer to obtain the first smallest data unit to be stored, and writing data not yet written in the appending data into the at least one smallest data unit to obtain the at least one second smallest data unit to be stored comprises:
sequentially writing at least some of the appending data into the data storage area in the smallest data unit of the buffer, and modifying, based on the at least some data, the metadata description area in the smallest data unit of the buffer to obtain the first smallest data unit to be stored; and
writing data not yet written in the appending data into a data storage area of at least one smallest data unit, and generating, based on data written in each data storage area, a corresponding metadata description area for each data storage area, so as to obtain the at least one second smallest data unit to be stored.

Clause 5. The method of clause 4, wherein:
the metadata comprises at least a valid data length after a last but one write operation, a valid data length after a last write operation, and whether data last written and at least some data in a next smallest data unit belong to a same append write request; and the method further comprises:
detecting data recovery instructions;
recovering, based on the valid data length after the last but one write operation in each of the smallest data unit, the valid data length after the last write operation, and whether the data last written and at least some data in the next smallest data unit belong to the same append write request, a data recovery length of a data file to a data end position of any append write request to maintain atomicity.

Clause 6. The method according to clause 4, wherein the recovering, based on the valid data length after the last but one write operation in each of the smallest data unit, the valid data length after the last write operation, and whether the data last written and at least some data in the next smallest data unit belong to the same append write request, the data recovery length of the data file to the data end position of any append write request to maintain atomicity comprises:
initializing a valid data length of data already written in the data file to zero and an initial scanning position to a start position of the data file in the storage device;
scanning the next smallest data unit;
verifying data after the last but one write operation in a current smallest data unit;
if the data after the last but one write operation in the current smallest data unit is verified, updating the valid data length of the data already written based on a valid data length after the last but one write operation in the current smallest data unit;
verifying data after the last write operation in the current smallest data unit;
if the data after the last write operation in the current smallest data unit is verified, detecting whether the current smallest data unit and the next smallest data unit belong to the same append write request;
if the current smallest data unit and the next smallest data unit belong to the same append write request, returning to the step of scanning the next smallest data unit to resume execution;
if the current smallest data unit and the next smallest data unit do not belong to the same append write request, updating, based on a valid data length after the last write operation in the current smallest data unit, the valid data length of the data already written and returning to the step of scanning the next smallest data unit to resume execution; and
if data after the last but one write operation or data after the last write operation in any smallest data unit is not verified, treating the valid data length of the current already-written data as the data recovery length of the data file.

Clause 7. The method of clause 6, wherein:
the metadata further comprises a data checksum after the last but one write operation and a data checksum after the last write operation; and
the verifying the data after the last but one write operation in the current smallest data unit comprises verifying, based on the data checksum of the last but one write operation in the current smallest data unit, the data after the last but one write operation; and
the verifying the data after the last write operation in the current smallest data unit comprises verifying, based on the data checksum after the last write operation in the current smallest data unit, the data after the last write operation.

Clause 8. The method according to clause 6, further comprising:
if data after the last write operation in any smallest data unit fails the verification, deleting the last written data and then buffering the any smallest data unit.

Clause 9. The method according to clause 3, wherein:
the writing data not yet written in the appending data into the data storage area of at least one smallest data unit comprises:
sequentially writing data not yet written in the appending data into a data storage area of at least one smallest data unit;
if a data storage area of any smallest data unit is not fully written with data, filling the data storage area with preset characters at an end of the data written in the data storage area of the any smallest data unit; and
the sequentially writing at least some of the appending data into the data storage area in the smallest data unit of the buffer comprises:
writing at least some of the appending data to a position of the preset characters in the data storage area of the smallest data unit of the buffer to replace the preset characters.

Clause 10. The method of clause 1, wherein the writing the first smallest data unit to be stored into the storage device in the overwriting manner comprises:
determining, based on a write start position of the append write request and the first fixed length of the smallest data unit, a position where data is to be written; and
writing, based on the position where data is to be written, the first smallest data unit to be stored into the storage device in the overwriting manner.

Clause 11. A data processing method comprising:
receiving a data-reading request;
calculating, based on a first fixed length of a smallest data unit, at least one target smallest data unit corresponding to the data-reading request; and
reading and splicing, from the storage device, valid data in the at least one target smallest data unit, wherein
valid data written in each smallest data unit comprises at least some appending data in an append write request or at least some appending data in an append write request and at least some appending data in a next append write request.

Clause 12. The method according to clause 11, wherein the calculating, based on the first fixed length of the smallest data unit, at least one target smallest data unit corresponding to the data-reading request comprises:
determining a request start position and a request offset corresponding to the data-reading request; and
calculating, based on the first fixed length of the smallest data unit, the request start position, and the request offset, at least one target smallest data unit corresponding to the read request.

Clause 13. The method according to clause 11, wherein:
the smallest data unit comprises a data storage area and a metadata description area located at an end of the data storage area, wherein the data storage area is used to store valid data and the metadata description area is used to store metadata of the valid data; and
the reading, from the storage device, the valid data in the at least one target smallest data unit and splicing the same comprises:
reading and splicing, from the storage device, valid data in the data storage area of the at least one target smallest data unit.

Clause 14. A data processing method comprising:
detecting data recovery instructions;
recovering, based on a valid data length after a last but one write operation in a metadata description area of a smallest data unit, a valid data length after a last write operation, and whether data last written and at least some data in a next smallest data unit belong to a same append write request, a data recovery length of a data file to a data end position of an append write request to maintain atomicity, wherein:
the smallest data unit comprises a data storage area and a metadata description area located at an end of the data storage area, wherein the data storage area is used to store valid data and the metadata description area is used to store metadata of the valid data; and
the valid data comprises at least some appending data in the append write request or at least some appending data in the append write request and at least some appending data in a next append write request.

Clause 15. The method of clause 14, wherein the step of recovery comprises:
initializing a valid data length of data already written in the data file to zero and an initial scanning position to a start position of the data file in the storage device;
scanning the next smallest data unit;
verifying data after the last but one write operation in a current smallest data unit;
if the data after the last but one write operation in the current smallest data unit is verified, updating the valid data length of the data already written based on a valid data length after the last but one write operation in the current smallest data unit;
verifying data after the last write operation in the current smallest data unit;
if the data after the last write operation in the current smallest data unit is verified, detecting whether the current smallest data unit and the next smallest data unit belong to the same append write request;
if the current smallest data unit and the next smallest data unit belong to the same append write request, returning to the step of scanning the next smallest data unit to resume execution;
if the current smallest data unit and the next smallest data unit do not belong to the same append write request, updating, based on a valid data length after the last write operation in the current smallest data unit, the valid data length of the data already written and returning to the step of scanning the next smallest data unit to resume execution; and
if data after the last but one write operation or data after the last write operation in any smallest data unit is not verified, treating the valid data length of the current already-written data as the data recovery length of the data file.

Clause 16. A data processing device comprising:
a buffer searching module configured to search for a smallest data unit of a buffer with regard to appending data in an append write request;
a data organizing module configured to sequentially write at least some of the appending data into the smallest data unit of the buffer to obtain a first smallest data unit to be stored, and write data not yet written in the appending data into at least one smallest data unit to obtain at least one second smallest data unit to be stored;
a data writing module configured to write the first smallest data unit to be stored into a storage device in an overwriting manner, and sequentially write the at least one second smallest data unit to be stored into the storage device; and
a data buffering module configured to buffer a smallest data unit not fully written that corresponds to the appending data.

Clause 17. A data processing device comprising:
a request receiving module configured to receive a data-reading request;

a calculation module configured to calculate, based on a first fixed length of a smallest data unit, at least one target smallest data unit corresponding to the data-reading request;

a data acquisition module configured to read, from a storage device, valid data in the at least one target smallest data unit and splice the same, wherein:

valid data written in each smallest data unit comprises at least some appending data in an append write request or at least some appending data in an append write request and at least some appending data in a next append write request.

Clause 18. A data processing device comprising:

a fault detection module configured to detect data recovery instructions; and a data recovery module configured to recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein:

the smallest data unit comprises a data storage area and the metadata description area located at an end of the data storage area, wherein the data storage area is used to store valid data and the metadata description area is used to store metadata of the valid data; and the valid data comprises at least some appending data in an append write request or at least some appending data in an append write request and at least some appending data in a next append write request.

Clause 19. A computer device comprising:

a storage component and a processing component, wherein:

the storage component is configured to store one or a plurality of computer-readable instructions, wherein the one or plurality of computer-readable instructions are called and executed by the processing component; and the processing component is configured to:

search for a smallest data unit of a buffer with regard to appending data in an append write request;

sequentially write at least some of the appending data into the smallest data unit of the buffer to obtain a first smallest data unit to be stored, and write data not yet written in the appending data into at least one smallest data unit to obtain at least one second smallest data unit to be stored;

write the first smallest data unit to be stored into a storage device in an overwriting manner, and sequentially write the at least one second smallest data unit to be stored into the storage device; and buffer a smallest data unit not fully written that corresponds to the appending data.

Clause 20. A computer device comprising:

a storage component and a processing component, wherein:

the storage component is configured to store one or a plurality of computer-readable instructions, wherein the one or plurality of computer-readable instructions are called and executed by the processing component; and the processing component is configured to:

receive a data-reading request;

calculate, based on a first fixed length of a smallest data unit, at least one target smallest data unit corresponding to the data-reading request; and read and splice, from a storage device, valid data in the at least one target smallest data unit, wherein valid data written in each smallest data unit comprises at least some appending data in an append write request or at least some appending data in an append write request and at least some appending data in a next append write request.

Clause 21. A computer device comprising:

a storage component and a processing component, wherein:

the storage component is configured to store one or a plurality of computer-readable instructions, wherein the one or plurality of computer-readable instructions are called and executed by the processing component; and the processing component is configured to:

detect data recovery instructions; and recover, based on a valid data length after a last but one write operation in a metadata description area of a smallest data unit, a valid data length after a last write operation, and whether data last written and at least some data in a next smallest data unit belong to a same append write request, a data recovery length of a data file to a data end position of any append write request to maintain atomicity, wherein:

the smallest data unit comprises a data storage area and a metadata description area located at an end of the data storage area, wherein the data storage area is used to store valid data and the metadata description area is used to store metadata of the valid data; and the valid data comprises at least some appending data in an append write request or at least some appending data in an append write request and at least some appending data in a next append write request.

What is claimed is:

1. A method comprising:

searching for a smallest data unit of a buffer with regard to appending data in an append write request;

sequentially writing at least some of the appending data into the smallest data unit of the buffer to obtain a first smallest data unit to be stored, and writing data not yet written in the appending data into one or more smallest data units to obtain at least one second smallest data unit to be stored;

writing the first smallest data unit to be stored into a storage device in an overwriting manner, and sequentially writing the at least one second smallest data unit to be stored into the storage device; and buffering a smallest data unit not fully written that corresponds to the appending data.

2. The method according to claim 1, further comprising:

receive a data-reading request;

calculating, based on a first fixed length of the smallest data unit of the buffer, at least one target smallest data unit corresponding to the data-reading request; and reading and splicing, from the storage device, valid data in the at least one target smallest data unit.

3. The method according to claim 2, wherein calculating, based on the first fixed length of the smallest data unit of the buffer, the at least one target smallest data unit corresponding to the data-reading request comprises:

determining a request start position and a request offset corresponding to the data-reading request; and calculating, based on the first fixed length of the smallest data unit of the buffer, the request start position, and the request offset, the at least one target smallest data unit corresponding to the data-reading request.

4. The method according to claim 1, wherein:

the smallest data unit of the buffer comprises a data storage area and a metadata description area located at an end of the data storage area, wherein the metadata description area is used to store metadata.

5. The method according to claim 4, wherein sequentially writing the at least some of the appending data into the smallest data unit of the buffer to obtain the first smallest data unit to be stored, and writing the data not yet written in the appending data into the one or more smallest data units to obtain the at least one second smallest data unit to be stored comprises:
- sequentially writing the at least some of the appending data into the data storage area in the smallest data unit of the buffer, and modifying, based on the at least some of the appending data, the metadata description area in the smallest data unit of the buffer to obtain the first smallest data unit to be stored; and
- writing the data not yet written in the appending data into a data storage area of at least one smallest data unit, and generating, based on data written in each data storage area, a corresponding metadata description area for each data storage area, so as to obtain the at least one second smallest data unit to be stored.

6. The method according to claim 4, wherein:
the metadata comprises at least a valid data length after a last but one write operation, a valid data length after a last write operation, and whether data last written and at least some data in a next smallest data unit belong to a same append write request.

7. The method according to claim 6, further comprising:
detecting data recovery instructions; and
recovering, based on the valid data length after the last but one write operation in each of the smallest data unit, the valid data length after the last write operation, and whether the data last written and the at least some data in the next smallest data unit belong to the same append write request, a data recovery length of a data file to a data end position of a respective append write request to maintain atomicity.

8. The method according to claim 7, wherein recovering, based on the valid data length after the last but one write operation in each of the smallest data unit, the valid data length after the last write operation, and whether the data last written and the at least some data in the next smallest data unit belong to the same append write request, the data recovery length of the data file to the data end position of the respective append write request to maintain atomicity comprises:
- initializing a valid data length of data already written in the data file to zero and an initial scanning position to a start position of the data file in the storage device;
- scanning the next smallest data unit;
- verifying data after the last but one write operation in a current smallest data unit;
- in response to determining that the data after the last but one write operation in the current smallest data unit is verified, updating the valid data length of the data already written based on a valid data length after the last but one write operation in the current smallest data unit;
- verifying data after the last write operation in the current smallest data unit;
- in response to determining that the data after the last write operation in the current smallest data unit is verified, detecting whether the current smallest data unit and the next smallest data unit belong to the same append write request;
- in response to determining that the current smallest data unit and the next smallest data unit belong to the same append write request, returning to the scanning of the next smallest data unit to resume execution; and
- in response to determining that the current smallest data unit and the next smallest data unit do not belong to the same append write request, updating, based on a valid data length after the last write operation in the current smallest data unit, the valid data length of the data already written and returning to the scanning of the next smallest data unit to resume execution.

9. The method according to claim 8, wherein recovering, based on the valid data length after the last but one write operation in each of the smallest data unit, the valid data length after the last write operation, and whether the data last written and the at least some data in the next smallest data unit belong to the same append write request, the data recovery length of the data file to the data end position of the respective append write request to maintain atomicity further comprises:
- in response to determining that data after the last but one write operation or data after the last write operation in a respective smallest data unit is not verified, treating a valid data length of a current already-written data as the data recovery length of the data file.

10. The method according to claim 9, wherein:
the metadata further comprises a data checksum after the last but one write operation and a data checksum after the last write operation.

11. The method according to claim 10, wherein verifying the data after the last but one write operation in the current smallest data unit comprises verifying, based on the data checksum of the last but one write operation in the current smallest data unit, the data after the last but one write operation.

12. The method according to claim 10, wherein verifying the data after the last write operation in the current smallest data unit comprises verifying, based on the data checksum after the last write operation in the current smallest data unit, the data after the last write operation.

13. The method according to claim 8, further comprising:
- in response to determining that the data after the last write operation in any smallest data unit fails the verification, deleting the data last written; and
- buffering the any smallest data unit.

14. The method according to claim 3, wherein writing the data not yet written in the appending data into a data storage area of the one or more smallest data units comprises:
- sequentially writing the data not yet written in the appending data into the data storage area of the one or more smallest data units; and
- in response to determining that a data storage area of a respective smallest data unit is not fully written with data, filling the data storage area with preset characters at an end of the data written in the data storage area of the respective smallest data unit.

15. The method according to claim 14, wherein sequentially writing the at least some of the appending data into the data storage area in the smallest data unit of the buffer comprises:
- writing the at least some of the appending data to a position of the preset characters in the data storage area of the smallest data unit of the buffer to replace the preset characters.

16. The method of claim 1, wherein writing the first smallest data unit to be stored into the storage device in the overwriting manner comprises:
- determining, based on a write start position of the append write request and a first fixed length of the smallest data unit of the buffer, a position where data is to be written; and writing, based on the position where the data is to be written, the first smallest data unit to be stored into the storage device in the overwriting manner.

17. A device comprising:
one or more processors; and
one or more memories storing computer-readable instructions that, executable by the one or more processors, cause the one or more processors to perform acts comprising:
receiving a data-reading request;
calculating, based on a first fixed length of a smallest data unit, at least one target smallest data unit corresponding to the data-reading request; and
reading and splicing, from a storage device, valid data in the at least one target smallest data unit, wherein valid data written in a respective smallest data unit comprises at least some appending data in an append write request or the at least some appending data in the append write request and at least some appending data in a next append write request.

18. The device according to claim 17, wherein calculating, based on the first fixed length of the smallest data unit, the at least one target smallest data unit corresponding to the data-reading request comprises:
determining a request start position and a request offset corresponding to the data-reading request; and
calculating, based on the first fixed length of the smallest data unit, the request start position, and the request offset, the at least one target smallest data unit corresponding to the data-reading request.

19. The device according to claim 17, wherein:
the at least one target smallest data unit comprises a data storage area and a metadata description area located at an end of the data storage area, wherein the data storage area is used to store the valid data and the metadata description area is used to store metadata of the valid data; and
reading and splicing, from the storage device, the valid data in the at least one target smallest data unit comprises reading and splicing, from the storage device, the valid data in the data storage area of the at least one target smallest data unit.

20. One or more memories storing computer-readable instructions that, when executed by one or more processors, cause the one or more processors to perform acts comprising:
detecting data recovery instructions; and
recovering, based on a valid data length after a last but one write operation in a metadata description area of a smallest data unit, a valid data length after a last write operation, and whether data last written and at least some data in a next smallest data unit belong to a same append write request, a data recovery length of a data file to a data end position of a current append write request to maintain atomicity, wherein:
the smallest data unit comprises a data storage area and a metadata description area located at an end of the data storage area, wherein the data storage area is used to store valid data and the metadata description area is used to store metadata of the valid data; and
the valid data comprises at least some appending data in the current append write request or the at least some appending data in the current append write request and at least some appending data in a next append write request.

* * * * *